US012593305B2

(12) United States Patent
Sahlin et al.

(10) Patent No.:  US 12,593,305 B2
(45) Date of Patent:  Mar. 31, 2026

(54) METHODS, APPARATUSES, SYSTEM AND PRODUCT FOR POSITIONING DETERMINATION

(71) Applicant: Telefonaktiebolaget LM Ericsson (PUBL), Stockholm (SE)

(72) Inventors: Henrik Sahlin, Mölnlycke (SE); Satyam Dwivedi, Solna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 579 days.

(21) Appl. No.: 18/001,897

(22) PCT Filed: Jun. 29, 2021

(86) PCT No.: PCT/EP2021/067841
§ 371 (c)(1),
(2) Date: Dec. 15, 2022

(87) PCT Pub. No.: WO2022/002933
PCT Pub. Date: Jan. 6, 2022

(65) Prior Publication Data
US 2023/0232365 A1      Jul. 20, 2023

Related U.S. Application Data

(60) Provisional application No. 63/046,293, filed on Jun. 30, 2020.

(51) Int. Cl.
*H04W 64/00*        (2009.01)
*G01S 5/02*         (2010.01)
(52) U.S. Cl.
CPC ......... *H04W 64/006* (2013.01); *G01S 5/0244* (2020.05); *G01S 5/0284* (2013.01)

(58) Field of Classification Search
CPC .................................................. H04W 64/006
(Continued)

(56) References Cited

U.S. PATENT DOCUMENTS 11,638,121 B2 *  4/2023  Akkarakaran ........ H04W 4/029
                                                      455/456.1
2014/0121960 A1 *  5/2014  Park ....................... G01C 21/12
                                                      701/494

(Continued)

FOREIGN PATENT DOCUMENTS

KR          102012247 B1      8/2019
WO      WO2019120516 A1      6/2019

OTHER PUBLICATIONS

3GPP TS 29.171 V15.4.0 (Dec. 2019); 3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLS interface (Release 15).

(Continued)

*Primary Examiner* — Qutbuddin Ghulamali
(74) *Attorney, Agent, or Firm* — Baker Botts L.L.P.

(57) ABSTRACT

A method (700, 800), system (3210) and apparatus (900, 1000) are disclosed. According to one aspect, a method (700) for determining positioning is performed by a wireless device (1000). The method (700) comprising: receiving (720) a reference signal and performing a positioning measurement based on the received reference signal; receiving (730) positioning information based on the received reference signal, wherein the received positioning information comprises a positioning measurement reported by a neighbouring wireless device performed on the reference signal; and determining (740) further positioning information based (Continued)

on the positioning measurement and the received positioning information.

19 Claims, 13 Drawing Sheets

(58) Field of Classification Search
USPC ........................................................ 455/456.1
See application file for complete search history.

(56) References Cited

U.S. PATENT DOCUMENTS

| | | | |
|---|---|---|---|
| 2020/0043348 A1* | 2/2020 | Ghosh | G05D 1/101 |
| 2023/0122170 A1* | 4/2023 | Bao | H04L 5/0051 |
| | | | 455/456.1 |

OTHER PUBLICATIONS

3GPP TS 29.172 v15.2.0 (Dec. 2019); 3rd Generation Partnership Project; Technical Specification Group Core Network and Terminals; Location Services (LCS); Evolved Packet Core (EPC) LCS Protocol (ELP) between the Gateway Mobile Location Centre (GMLC) and the Mobile Management Entity (MME); SLg interface (Release 15).

3GPP TS 36.305 V16.0.0 (Mar. 2020); 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 16).

3GPP TS 36.331 V16.0.0 (Mar. 2020); 3rd Generation Partnership Project; Technical Specification Group Radio Access Network; Evolved Universal Terrestrial Radio Access (E-UTRA); Radio Resource Control (RRC); Protocol specification (Release 16).

3GPP TS 36.355 V15.6.0 (Dec. 2019); 3rd Generation Partnership Project; Technical Specification Group Radio Access Network; Evolved Universal Terrestrial Radio Access (E-UTRA); LTE Positioning Protocol (LPP) (Release 15).

3GPP TS 36.455 V16.0.0 (Mar. 2020); 3rd Generation Partnership Project; Technical Specification Group Radio Access Network; Evolved Universal Terrestrial Radio Access (E-UTRA); LTE Positioning Protocol A (LPPa) (Release 16).

3GPP TS 38.305 V16.0.0 (Mar. 2020); 3rd Generation Partnership Project; Technical SpecificationNetwork; NG Radio Access Network (NG-RAN); Stage 2 functional specification of User Equipment (UE) positioning in NG-RAN (Release 16).

3GPP TR 33.855 v1.4.0; 3rd Generation Partnership Project; Technical Specification Group Services and System Aspects; Security Aspects; Study on security aspects of the 5G Service Based Architecture (SBA) (Release 16)—Mar. 2019.

Jun Yao et al., "Improving Cooperative Positioning for Vehicular Networks" IEEE Transactions on Vehicular Technology, vol. 60, No. 6—Jul. 2011.

Sanghyuck Nam et al., "CNVPS: Cooperative Neighboring Vehicle Positioning System Based on Vehicle-to-Vehicle Communication" IEEE Access—Feb. 14, 2019.

PCT Notification of Transmittal of the International Search Report and the Written Opinion of the International Searching Authority, or the Delcaration issued for International application No. PCT/EP2021/067841—Oct. 14, 2021.

3GPP TR 38.855 V1.1.0 (Mar. 2019); 3rd Generation Partnership Project; Technical Specification Group Radio Access Network; Study on NR positioning support (Release 16).

Examination Report No. 1 issued by Australian Government/IP Australia for Application No. 2021301176—Sep. 12, 2023.

Kasper Bonne Rasmussen et al. "Location Privacy of Distance Bounding Protocols"—CCS, Oct. 27-31, 2008, Alexandria, Virginia.

EPO Communication pursuant to Article 94(3) EPC issued for Application No. 21 737 640.9-1215—Jan. 31, 2025.

* cited by examiner

500

510

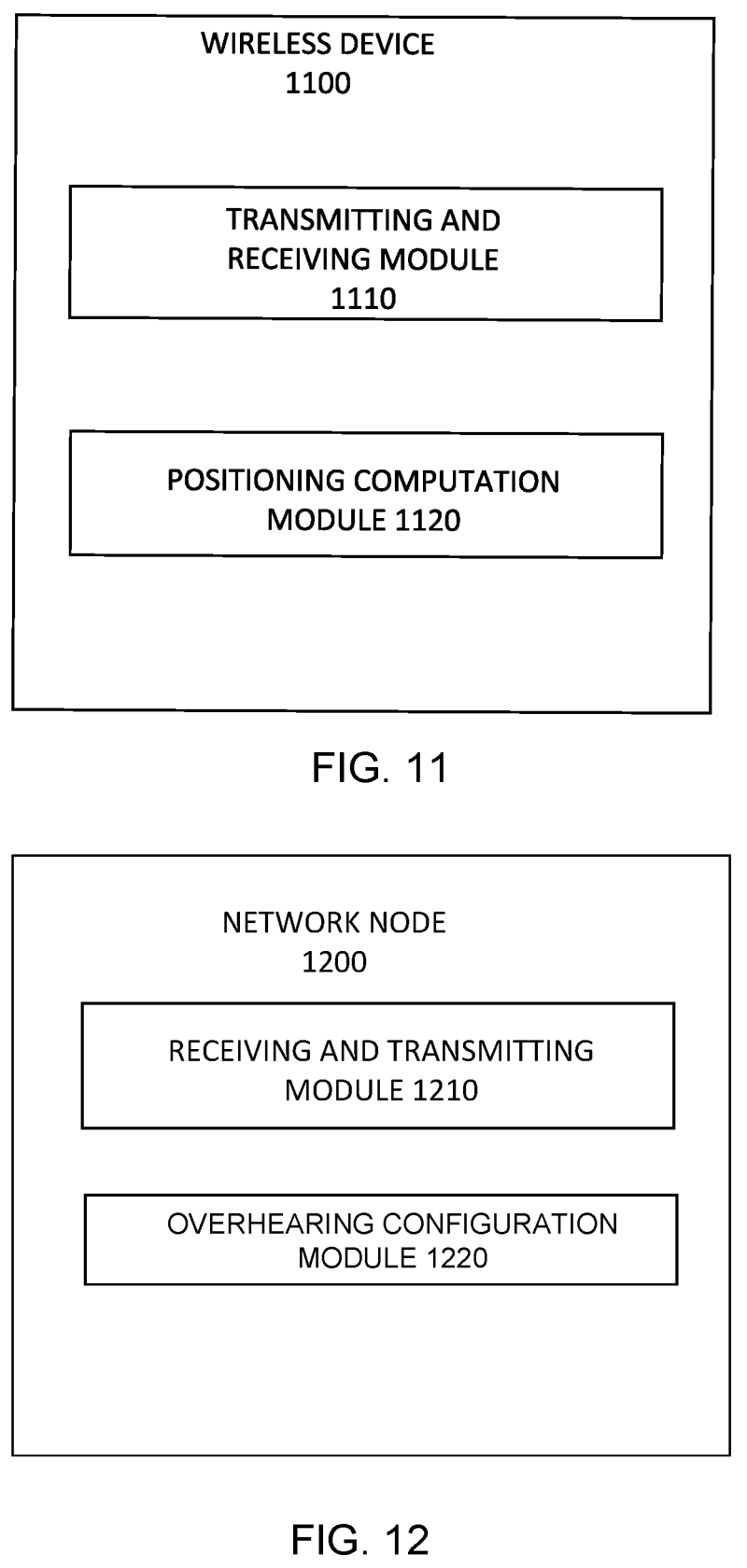

WIRELESS DEVICE
1100

TRANSMITTING AND
RECEIVING MODULE
1110

POSITIONING COMPUTATION
MODULE 1120

FIG. 11

NETWORK NODE
1200

RECEIVING AND TRANSMITTING
MODULE 1210

OVERHEARING CONFIGURATION
MODULE 1220

FIG. 12

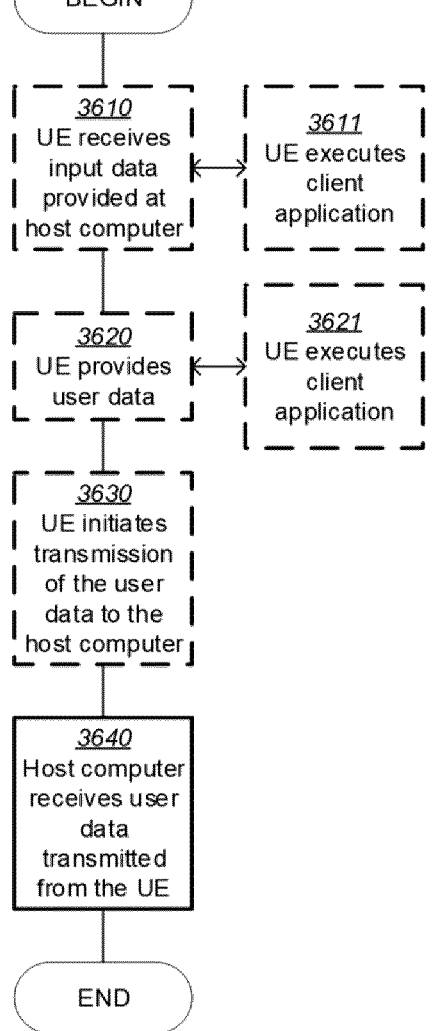
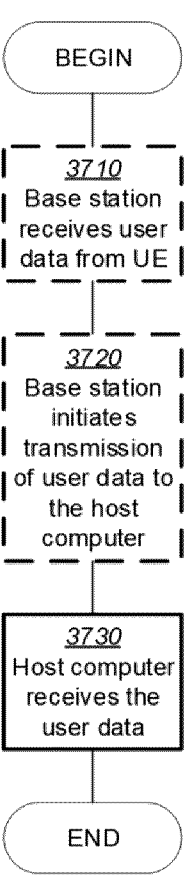
FIG. 17
FIG. 18

METHODS, APPARATUSES, SYSTEM AND PRODUCT FOR POSITIONING DETERMINATION

PRIORITY

This nonprovisional application is a U.S. National Stage Filing under 35 U.S.C. § 371 of International Patent Application Serial No. PCT/EP2021/067841 filed Jun. 29, 2021 and entitled "METHODS, APPARATUSES, SYSTEM AND PRODUCT FOR POSITIONING DETERMINATION" which claims priority to U.S. Provisional Patent Application No. 63/046,293 filed Jun. 30, 2020 both of which are hereby incorporated by reference in their entirety.

TECHNICAL FIELD

Embodiments herein relate generally to a base station and a method in the base station, and to a User Equipment (UE) and a method in the user equipment. More particularly the embodiments herein relate to positioning determination.

BACKGROUND

Location-based services and emergency call positioning drives the development of positioning in wireless networks and a plethora of applications and services in terminals take advantage of the position. Positioning in 3rd Generation Partnership Project (3GPP) Long Term Evolution (LTE) is supported by the architecture in FIG. 1, with direct interactions between a UE 10 and a location server or Evolved-Serving Mobile Location Centre (E-SMLC) 50 via the LTE Positioning Protocol (LPP), e.g. as specified by 3GPP TS 36.355 V.15.6.0 (2020-01-08). Moreover, there are also interactions between the location server 50 and the eNodeB 20 via the LPPa protocol, e.g. as specified by 3GPP TS 36.455 V16.0.0 (2020-03-31) to some extent supported by interactions between the eNodeB 20 and the UE 10 via the Radio Resource Control (RRC) protocol, e.g. as specified by 3GPP TS 36.331 V16.0.0 (2020-04-06). The Gateway Mobile Location Centre (GMLC) 40 provides information coding for the Evolved Packet Core (EPC) Location Services (LCS) Protocol (ELP) that is needed to support the location services in E-UTRAN, UTRAN and GERAN. The ELP message set is applicable to the SLg interface between the Mobility Management Entity (MME) 30 and the GMLC 40, see for example 3GPP TS 29.172 V15.2.0 (2019-12-20). The LCS Application Protocol (LCS-AP) between the MME 30 and the E-SMLC 50 provides procedures and information coding needed to support location services in E-UTRAN. See for example 3GPP TS 29.171 V15.4.0 (2019-12-20).

The following positioning techniques are considered in LTE, see for example 3GPP TS 36.305 V16.0.0 (2020-03):

Enhanced Cell ID. Essentially cell ID information to associate the UE to the serving area of a serving cell, and then additional information to determine a finer granularity position.

Assisted Global Navigation Satellite System (GNSS). GNSS information retrieved by the UE, supported by assistance information provided to the UE from E-SMLC.

OTDOA (Observed Time Difference of Arrival). The UE estimates the time difference of reference signals from different base stations and sends to the E-SMLC for multilateration.

UTDOA (Uplink TDOA). The UE is requested to transmit a specific waveform that is detected by multiple location measurement units (e.g. an eNB) at known positions. These measurements are forwarded to E-SMLC for multilateration.

In the Observed Time Difference Of Arrival (OTDOA), the UE measures the time of arrival (TOA) of specific positioning reference signals (PRS) from multiple cells (eNBs), and computes the relative differences between each cell and a reference cell. These reference signal time difference (RSTD) are quantized and reported via LPP to the E-SMLC together with an accuracy assessment. Based on known positions of eNBs and their mutual time synchronization, it is possible for the E-SMLC to estimate the UE position from the RSTD and covariance reports using multilateration. The accuracy depends on the radio conditions of the received signals, number of received signals as well as the deployment, which means that it will vary spatially.

In 3GPP next generation radio (NR), positioning methods are described in 3GPP TS 38.305 V16.0.0 (2020-03). The document specifies the stage 2 of the UE Positioning function of NG-RAN which provides the mechanisms to support or assist the calculation of the geographical position of a UE. UE position knowledge can be used, for example, in support of Radio Resource Management functions, as well as location-based services for operators, subscribers, and third-party service providers. The purpose of this stage 2 specification is to define the NG-RAN UE Positioning architecture, functional entities and operations to support positioning methods. This description is confined to the NG-RAN Access Stratum. It does not define or describe how the results of the UE position calculation can be utilised in the CoreNetwork (e.g., LCS) or in NG-RAN (e.g., RRM). FIG. 2 depicts a positioning architecture in accordance with 3GPP TS 38.305.

The standard positioning methods supported for NG-RAN access are:

network-assisted GNSS methods;

observed time difference of arrival (OTDOA) positioning based on LTE signals;

enhanced cell ID methods based on LTE signals;

WLAN positioning;

Bluetooth positioning;

terrestrial beacon system (TBS) positioning;

sensor based methods:

barometric Pressure Sensor;

motion sensor.

NR enhanced cell ID methods (NR E-CID) based on NR signals;

Multi-Round Trip Time Positioning (Multi-RTT based on NR signals);

Downlink Angle-of-Departure (DL-AoD) based on NR signals;

Downlink Time Difference of Arrival (DL-TDOA) based on NR signals;

Uplink Time Difference of Arrival (UL-TDOA) based on NR signals;

Uplink Angle of Arrival (UL-AoA), including the Azimuth of Arrival (A-AoA) and the Zenith of Arrival (Z-AoA) based on NR signals.

Hybrid positioning using multiple methods from the list of positioning methods above is also supported. Standalone mode (e.g. autonomous, without network assistance) using one or more methods from the list of positioning methods above is also supported. These positioning methods may be supported in UE-based, UE-assisted/LMF-based, and NG-RAN node assisted versions. Table 1 (Table 4.3.1-1 from TS 38.306) indicates which of these versions are supported in the current version of the specification for the standardised positioning methods.

Sensor, WLAN, Bluetooth, and TBS positioning methods based on MBS signals are also supported in standalone mode, as described in the corresponding clauses.

UE Positioning may be considered as a network-provided enabling technology consisting of standardised service capabilities that enable the provision of location applications. The application(s) may be service provider specific. The description of the numerous and varied possible location applications which are enabled by this technology is outside the scope of the present document. However, clarifying examples of how the functionality being described may be used to provide specific location services may be included.

TABLE 1

| Supported versions of UE positioning methods | | | | |
|---|---|---|---|---|
| Method | UE-based | UE-assisted, LMF-based | NG-RAN node assisted | SUPL |
| A-GNSS | Yes | Yes | No | Yes (UE-based and UE-assisted) |
| OTDOA *Note1, Note 2* | No | Yes | No | Yes (UE-assisted) |
| E-CID *Note 4* | No | Yes | Yes | Yes for E-UTRA (UE-assisted) |
| Sensor | Yes | Yes | No | No |
| WLAN | Yes | Yes | No | Yes |
| Bluetooth | No | Yes | No | No |
| TBS *Note 5* | Yes | Yes | No | Yes (MBS) |
| DL-TDOA | Yes | Yes | No | No |
| DL-AoD | Yes | Yes | No | No |
| Multi-RTT | No | Yes | Yes | No |
| NR E-CID | No | Yes | FFS | No |
| UL-TDOA | No | No | Yes | No |
| UL-AoA | No | No | Yes | No |

*Note1*

This includes TBS positioning based on PRS signals.

*Note 2*

In this version of the specification only OTDOA based on LTE signals is supported.

NOTE 3:

Void

*Note 4*

This includes Cell-ID for NR method.

*Note 5*

In this version of the specification only for TBS positioning based on MBS signals.

NOTE 6:

Void

The Multi-RTT positioning method makes use of the UE Rx-Tx measurements and DL PRS RSRP of downlink signals received from multiple TRPs, measured by the UE and the measured gNB Rx-Tx measurements and UL SRS-RSRP at multiple TRPs of uplink signals transmitted from UE.

The UE measures the UE Rx-Tx measurements (and optionally DL PRS RSRP of the received signals) using assistance data received from the positioning server, and the TRPs measure the gNB Rx-Tx measurements (and optionally UL SRS-RSRP of the received signals) using assistance data received from the positioning server. The measurements are used to determine the RTT at the positioning server which are used to estimate the location of the UE. The operation of the Multi-RTT positioning method is described further in 3GPP TS 38.305 V16.0.0. clause 8.10.

WO 2019/120516 A1 describes a method for determining a refined position of a first vehicle, the method comprising: receiving, from the first vehicle, vehicle specific information comprising:—a vehicle identity information comprising a vehicle specific identity used by the first vehicle to identify itself in a communication with entities external to the first vehicle—a first position information including a position of the first vehicle as determined by a first sensor of the first vehicle with a first accuracy,—receiving, from a second sensor, distance data comprising at least a measured distance from the second sensor to one vehicle, the measured distance being determined by the second sensor with a second accuracy greater than the first accuracy, the distance data further comprising second description data by which an outer appearance of said one vehicle as seen by the second sensor is described,—determining that said one other vehicle is the first vehicle and that the measured distance determined by the second.

The UE may make measurements of downlink signals from NG-RAN and other sources such as E-UTRAN, different GNSS and TBS systems, WLAN access points, Bluetooth beacons, UE barometric pressure and motion sensors. The measurements to be made will be determined by the chosen positioning method. The UE may also contain LCS applications, or access an LCS application either through communication with a network accessed by the UE or through another application residing in the UE. This LCS application may include the needed measurement and calculation functions to determine the UE's position with or without network assistance. This is outside of the scope of this specification. The UE may also, for example, contain an independent positioning function (e.g., GPS) and thus be able to report its position, independent of the NG-RAN transmissions. The UE with an independent positioning function may also make use of assistance information obtained from the network.

The gNB is a network element of NG-RAN that may provide measurement information for a target UE and communicates this information to an LMF. To support NR RAT-Dependent positioning, the gNB may provide measurement results for position estimation and makes measurements of radio signals for a target UE and communicates these measurements to an LMF. A gNB may serve several TRPs, including for example remote radio heads, and UL-SRS only RPs and DL PRS-only TPs. A gNB may broadcast assistance data information, received from an LMF, in positioning System Information messages.

One of the problems associated with positioning measurements and position determination is the accuracy or estimation error.

SUMMARY

In this disclosure at least one of the embodiments comprises listening to positioning measurements of neighboring wireless devices. In certain examples the wireless devices are vehicular type devices, e.g. cars. In such examples, cars report positioning measurements of neighboring cars to the network or they utilize these measurements to compute position by themselves. These overheard measurements when combined with other information sources provide more accurate position estimation and information on position of surrounding cars.

In certain embodiments a positioning system is described where a UE (User Equipment, e.g. located in a car) is connected to the network and performs RTT (Round Trip Time) signaling. Other UEs in the vicinity receive and process signals related to this exchange and communicate certain parameters to the network along with RSTD (Reference Signals Time Difference) measurements collected while overhearing the RTT signaling exchange between the UE and its serving base station. In some examples PRS for positioning is received and measurements performed on it. An overhearing UE makes time of arrival measurement of the signal from neighboring cars (UE). The signal is a reference signal.

In some examples a communicated parameter also includes the UEs location estimates and confidence on their own location estimates. In some examples described in this disclosure positioning accuracy is improved. Methods are disclosed which provide a way to collect more information for estimating a UEs (e.g. a car's) position using information from surrounding cars. In some examples communication means is provided for improving the positioning accuracy.

In certain embodiments cars in the vicinity of each other perform listening or overhearing of each other's positioning measurements and or positioning reports and in further examples exchanging of positioning information between one or more of other cars. In some examples the exchanging and overhearing between UEs occurs in conjunction with reporting at least some of the measurements to the network to do the positioning calculations. In other examples the wireless devices, e.g. cars share measurements with each other to enhance UE based positioning accuracy.

In a first aspect, a method for determining positioning performed by a wireless device, is provided. The method comprises receiving a reference signal and performing a positioning measurement based on the received first reference signal. The method further comprises receiving positioning information based on the reference signal, wherein the received positioning information comprises a positioning measurement reported by a neighbouring wireless device performed on the reference signal. The method further comprises determining further positioning information based on the positioning measurement and the received positioning information.

In some examples of the first aspect the reported positioning measurement is reported by neighbouring wireless device to a network node and the receiving of the positioning information comprises overhearing the positioning measurement report.

In some examples of the first aspect the reference signal is a positioning reference signal received from a network node or a neighbouring device.

In some examples of the first aspect the reference signal is a positioning reference signal received from a neighbouring wireless device.

In some examples of the first aspect the received positioning information comprises a round trip time measurement received from the neighbouring wireless device.

In some examples of the first aspect the received positioning information comprises positioning information determined by a neighbouring wireless device overhearing positioning signalling exchanges from other neighbouring wireless devices In some examples the overheard positioning signalling exchanges correspond to positioning measurements performed by the wireless device.

In some examples of the first aspect the received positioning information includes an estimation error corresponding to a reported positioning measurement.

In some examples of the first aspect the determined further positioning information comprises at least one of: a velocity; a relative velocity; a relative position of the wireless device to a neighbouring wireless device; an estimation error; one or more neighbouring wireless device positioning information.

In some examples of the first aspect the performed positioning measurement is a reference signal received time difference, RSTD measurement.

In some examples of the first aspect, the method further comprises transmitting positioning information comprising the determined further positioning information. In some examples the transmitted positioning information further comprises own location information of the wireless device, e.g. based on GNSS. Optionally, the transmitted positioning information may be transmitted to a serving network node.

In some examples of the first aspect the method further comprises: receiving from a serving network node configuration information comprising at least one of: measurement reception configuration for receiving measurement reports from neighbouring wireless devices; measurement reporting configuration for detection by neighbouring wireless devices; an indication corresponding to a neighbouring wireless device from which the first measurement report is to be received.

In some examples of the first aspect the method further comprises receiving a plurality of measurement reports and the determining further positioning information being based on the plurality of measurement reports.

In some examples of the first aspect the method further comprises receiving a third measurement report comprising third positioning information from a neighbouring wireless device wherein both the wireless device and the neighbouring wireless device are moving and wherein the further positioning information is determined based on one or more deltas between the first positioning information and the third positioning information from the neighbouring wireless device. In some examples a measurement report comprising tracking information corresponding to the neighbouring device based on the one or more deltas between the first and third positioning information from the neighbouring wireless device.

In a second aspect, a method performed by a network node is provided. The method comprises receiving positioning information from a wireless device, the positioning information comprising overhearing positioning information based on overheard positioning exchanges from one or more neighbouring wireless devices.

In some examples of the second aspect the method further comprises transmitting configuration information comprising at least one of: measurement reception configuration for a wireless device to receive measurement reports comprising positioning information from neighbouring wireless devices; measurement reporting configuration for a wireless device to transmit measurement reports comprising positioning information to neighbouring wireless devices; and an indication corresponding to a neighbouring wireless device from which a measurement report is to be received;

In a third aspect a wireless device comprising processing circuitry, memory and transceiver circuitry is provided. The processing circuitry is configured to receive, via the transceiver circuitry, a reference signal and perform a positioning measurement based on the received reference signal. The processing circuitry is further configured to receive, via the transceiver circuitry, positioning information based on the first reference signal wherein the received positioning information comprises a positioning measurement reported by a neighbouring wireless device performed on the reference signal; and the processing circuitry is configured to determine further positioning information based on the positioning measurement and the received positioning information.

In some examples of the third aspect the processing circuitry is further configured to perform any one of the examples of the first aspect.

In some examples of the third aspect the wireless device comprises a vehicular based device.

In a fourth aspect a network node comprising processing circuitry, memory, and transceiver circuitry is provided. The processor circuitry is configured to receive, via the transceiver circuitry, positioning information from a wireless device, the positioning information comprising overhearing positioning information based on overheard positioning exchanges from one or more neighbouring wireless devices.

In some examples of the fourth aspect the processing circuitry is further configured to transmit configuration information comprising at least one of: measurement reception configuration for a wireless device to receive measurement reports comprising positioning information from neighbouring wireless devices; measurement reporting configuration for a wireless device to transmit measurement reports comprising positioning information to neighbouring wireless devices; an indication corresponding to a neighbouring wireless device from which a measurement report is to be received;

In some examples of the fourth aspect the network node is a base station, gNB or eNB.

In a fifth aspect a system for determining positioning information is provided. The system comprises one or more network nodes and a plurality of wireless devices, wherein one or more of the plurality of wireless devices receives a reference signal and performs a positioning measurement based on the received reference signal and receives positioning information based on the received reference signal, wherein the received positioning information comprises a positioning measurement reported by a neighbouring wireless device performed on the reference signal; the one or more wireless device determines further positioning information based on the positioning measurement and the received positioning information and transmits the determined further positioning information to one or more of the plurality of wireless devices and/or to the one or more network nodes; and the one or more network nodes and/or wireless devices determining enhanced positioning accuracy of predetermined positioning estimates based on the received further positioning information.

In some examples of the fifth aspect the enhanced positioning accuracy comprises ellipse predictions of positioning estimates with reduced variance.

In some examples of the fifth aspect the system further incorporates any one of the examples of the first and second aspects.

In a sixth aspect a computer program, program product (920, 1020), carrier or medium comprising instructions is provided. The instructions when executed on a processor of a computer cause the processor to perform any one of the methods of the first and second aspects.

8

Figure 6:
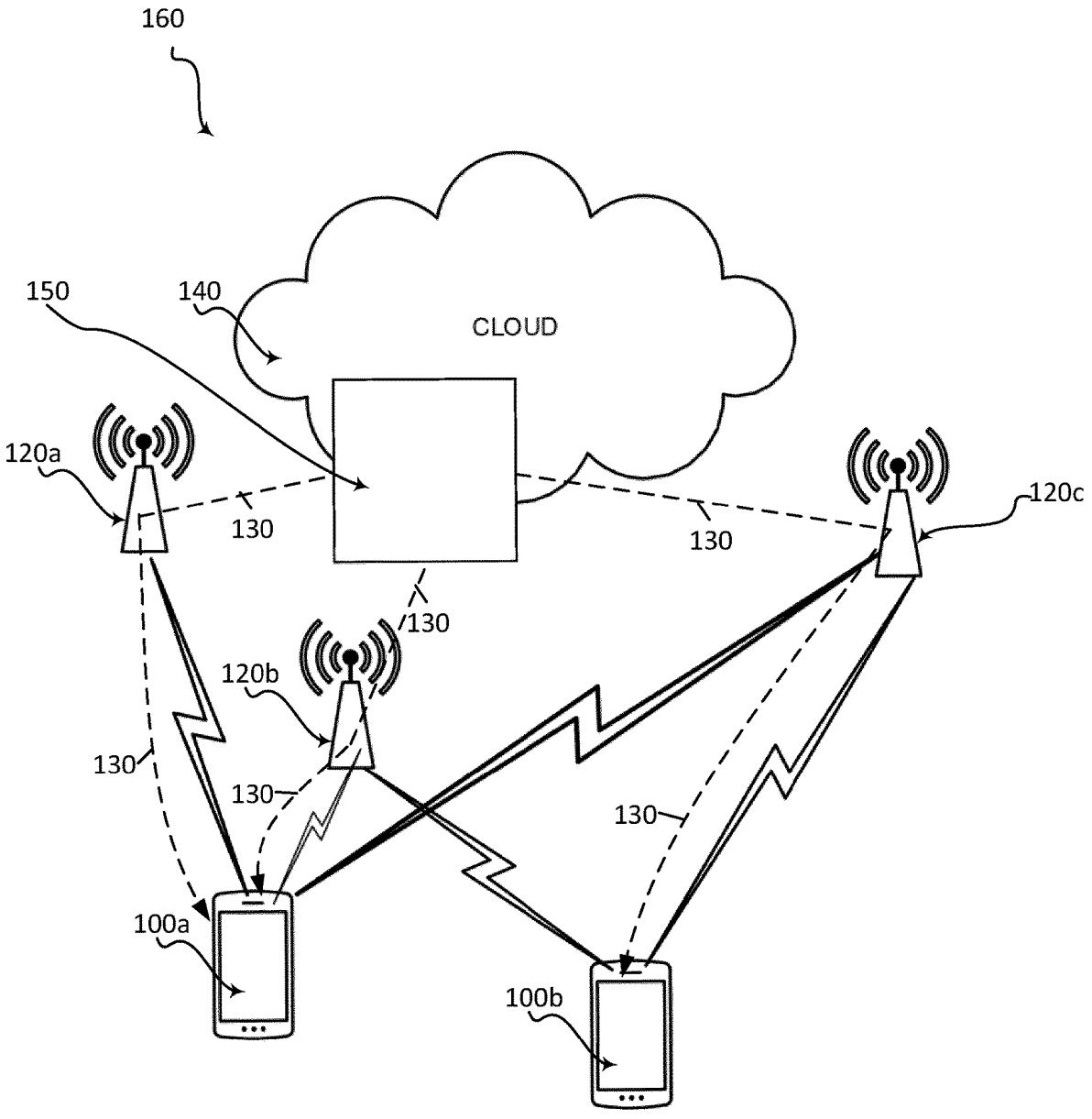

FIG. 6 is an exemplary network according to one or more embodiments disclosed herein.

Figure 7:
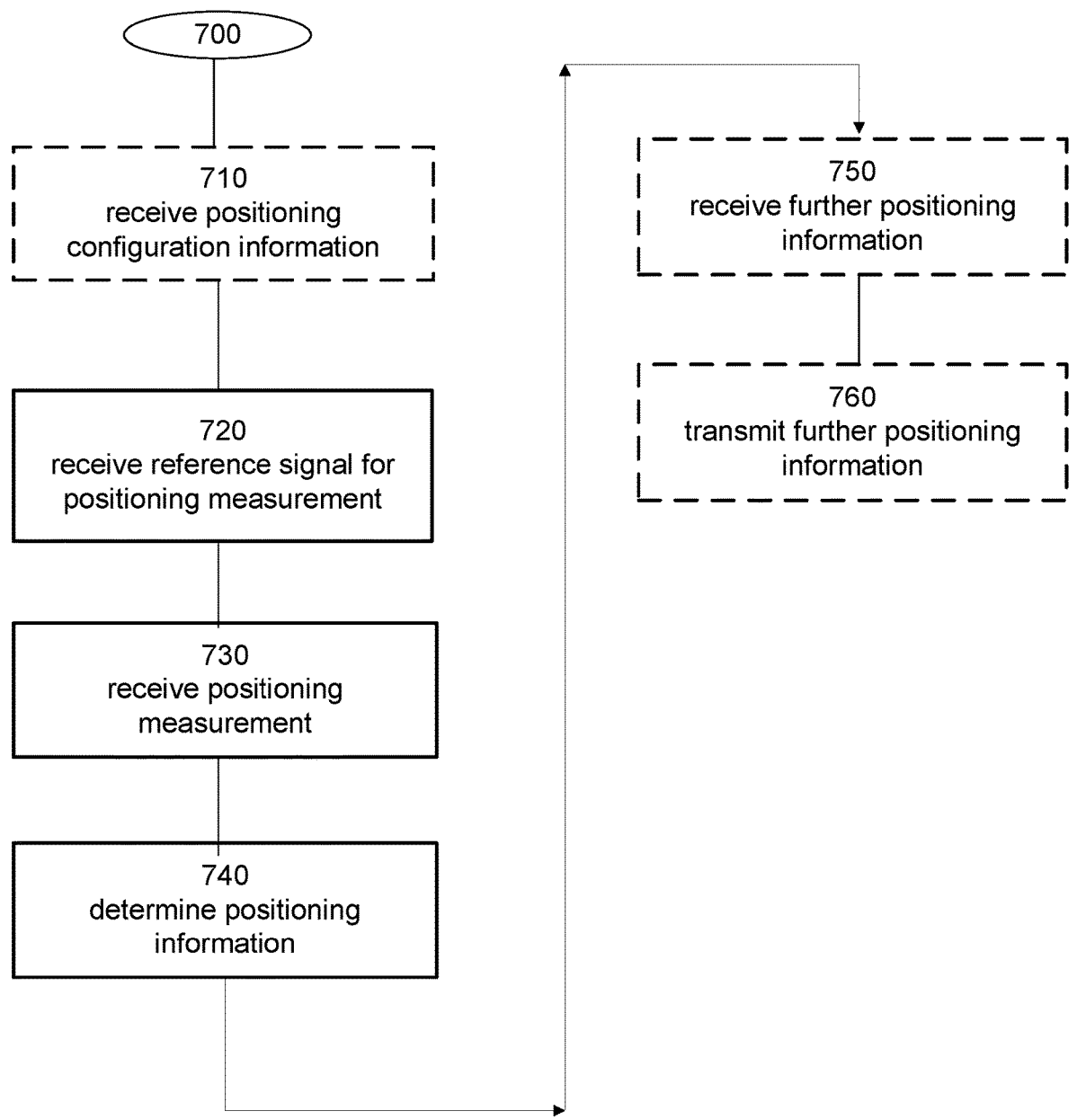

FIG. 7 is flowchart of an example method according to embodiments of the present disclosure.

Figure 8:
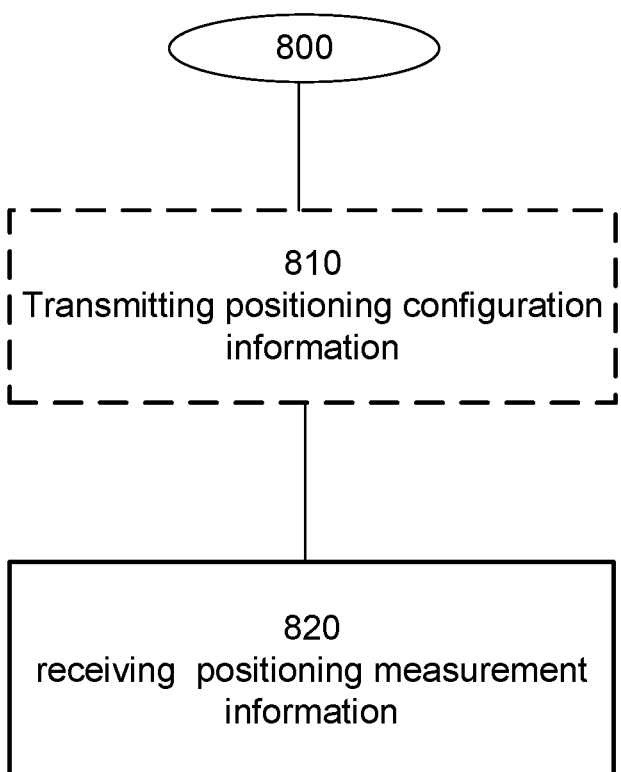

FIG. 8 a flowchart of an example method according to embodiments of the present disclosure.

Figure 9:
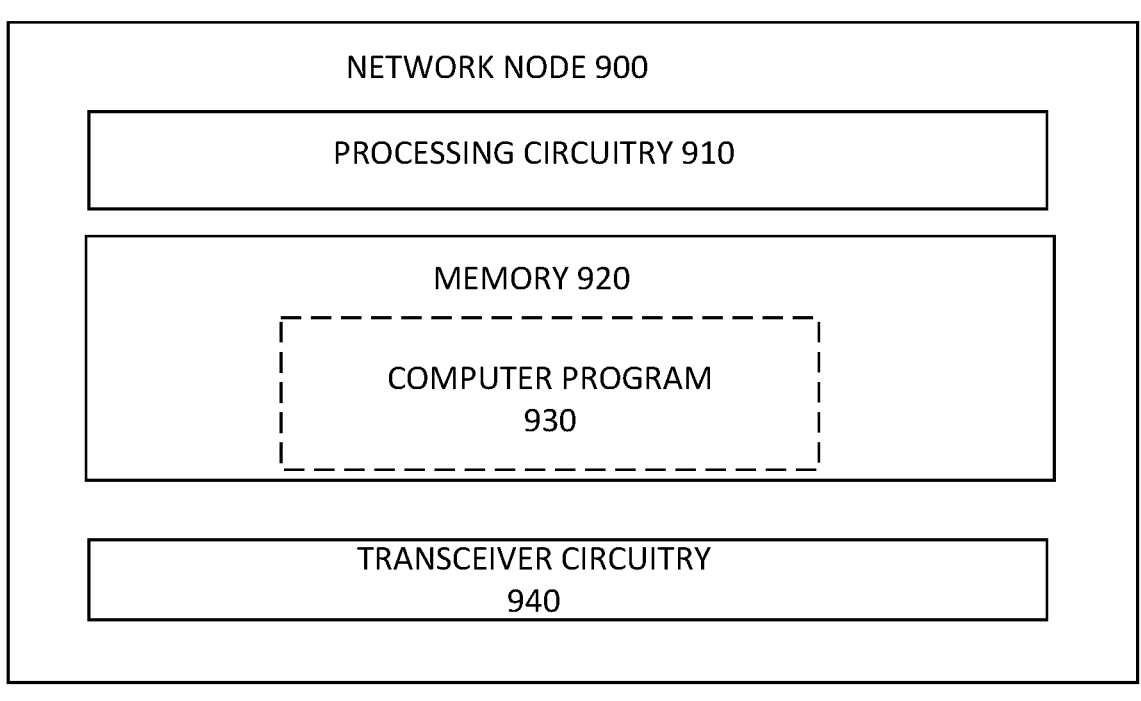

FIG. 9 is a block diagram illustrating an example network node according to one or more embodiments of the present disclosure.

Figure 10:
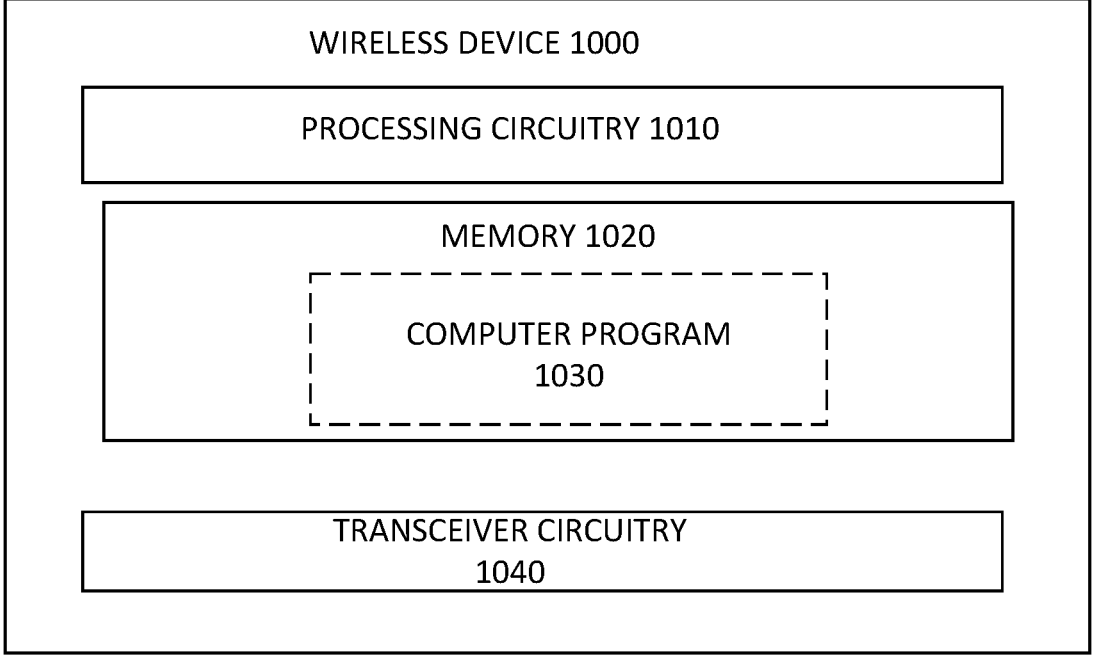

FIG. 10 is a block diagram illustrating an example wireless device according to one or more embodiments of the present disclosure.

FIG. 11 is a block diagram illustrating an example wireless device comprising software modules according to one or more embodiments of the present disclosure.

FIG. 12 is a block diagram illustrating an example network node comprising software modules according to one or more embodiments of the present disclosure.

Figure 13:
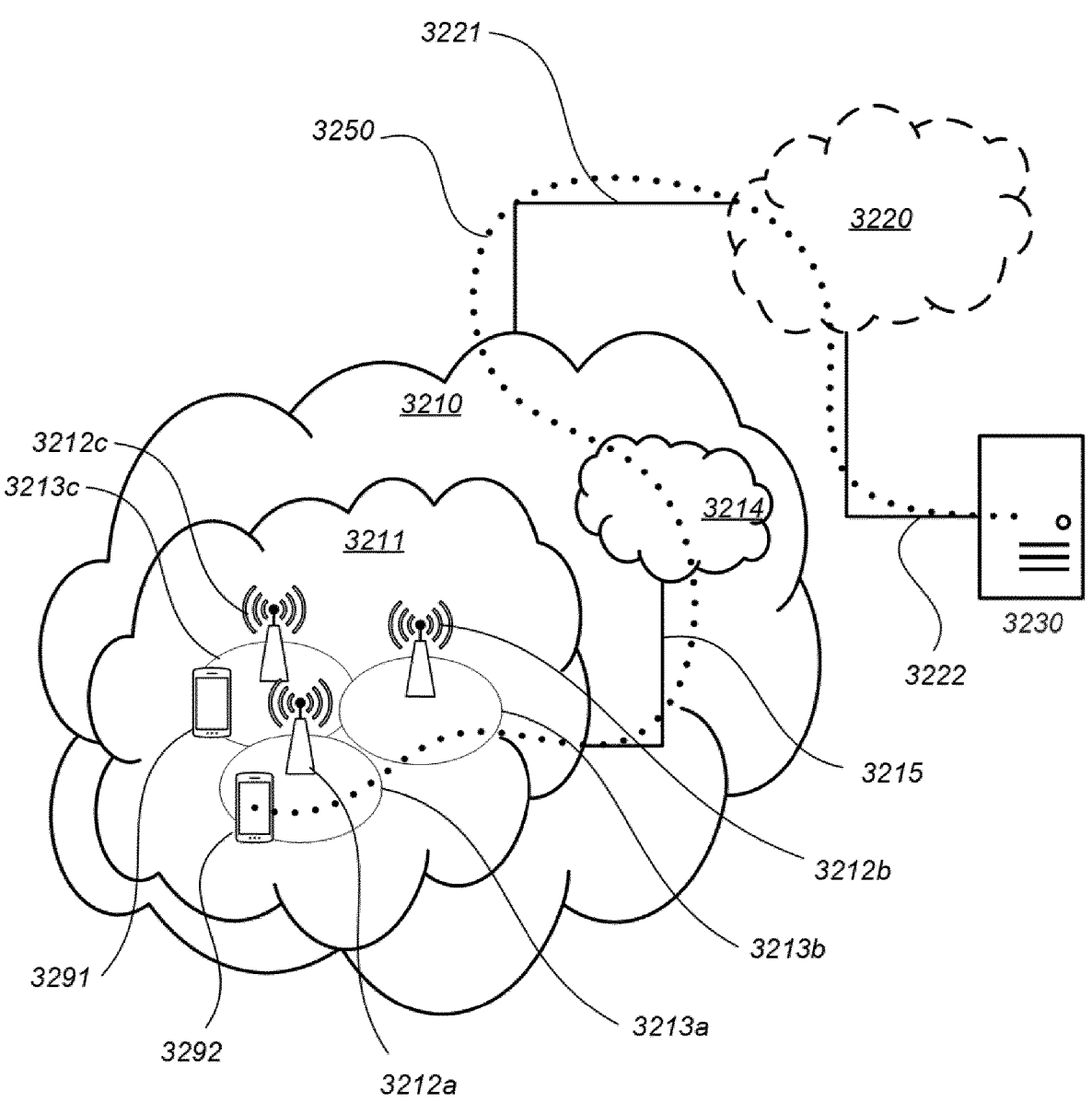

FIG. 13 schematically illustrates a telecommunication network connected via an intermediate network to a host computer.

Figure 14:
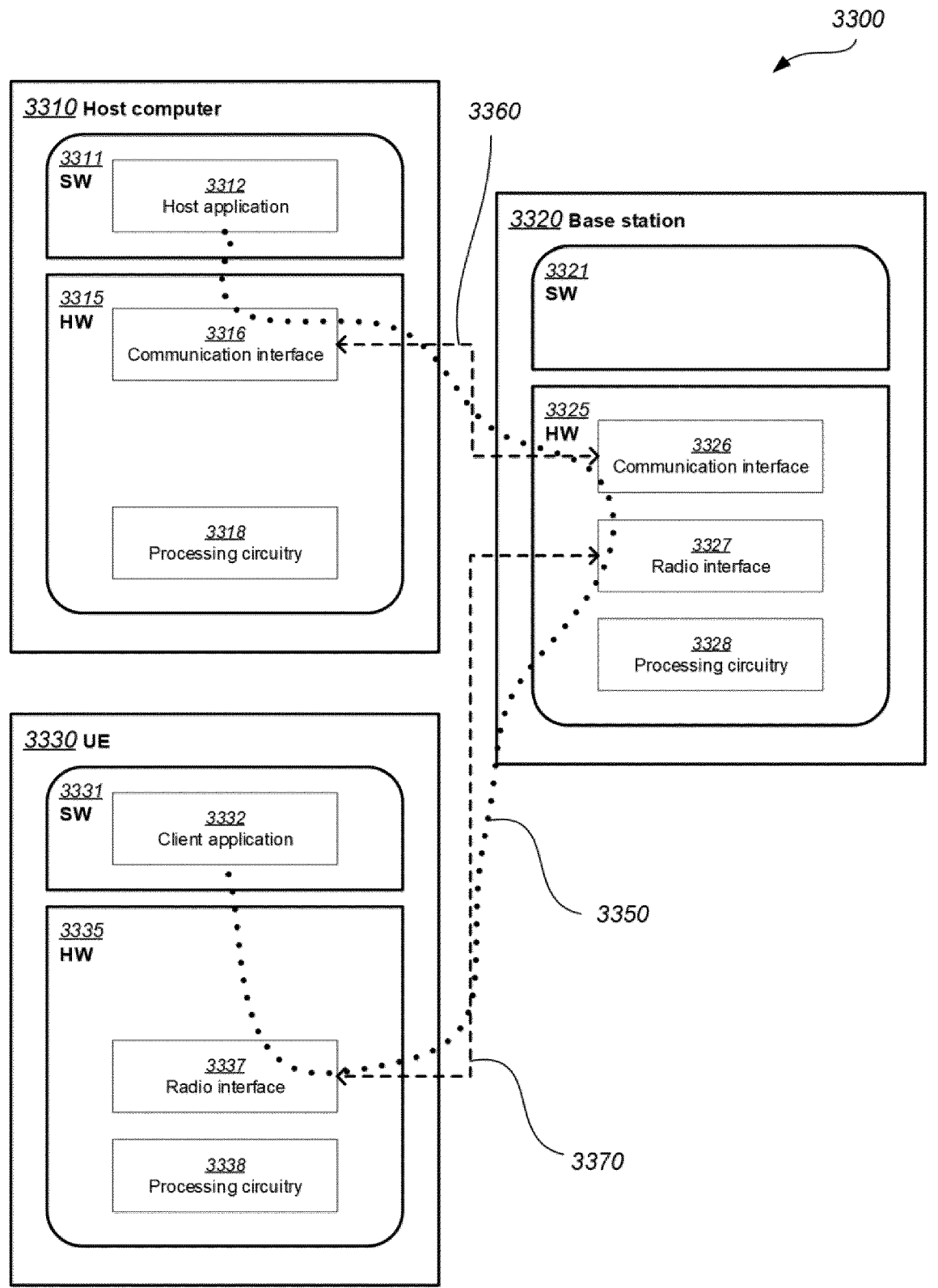

FIG. 14 is a generalized block diagram of a host computer communicating via a base station with a user equipment over a partially wireless connection.

FIGS. 15 to 18 are flowcharts illustrating methods implemented in a communication system including a host computer, a base station and a user equipment.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In at least some of the embodiments disclosed an improved positioning accuracy is obtained, in particular with regards to vehicular devices.

In the following descriptions, the UEs are described for an example as being vehicular, in other words in a moving environment where the position of the wireless device is both changing rapidly in real terms but also changing relative to other vehicular devices in their vicinity. The term "cars" is used herein to refer to such a vehicular based wireless device however, the embodiments are applicable for other associations of UEs with devices or equipment such as, but not limited to, robots, flying objects (e.g. drones), mobile phones, cars, trucks, railway vehicles, boats, bicycles, pedestrians etc.

Figure 1:
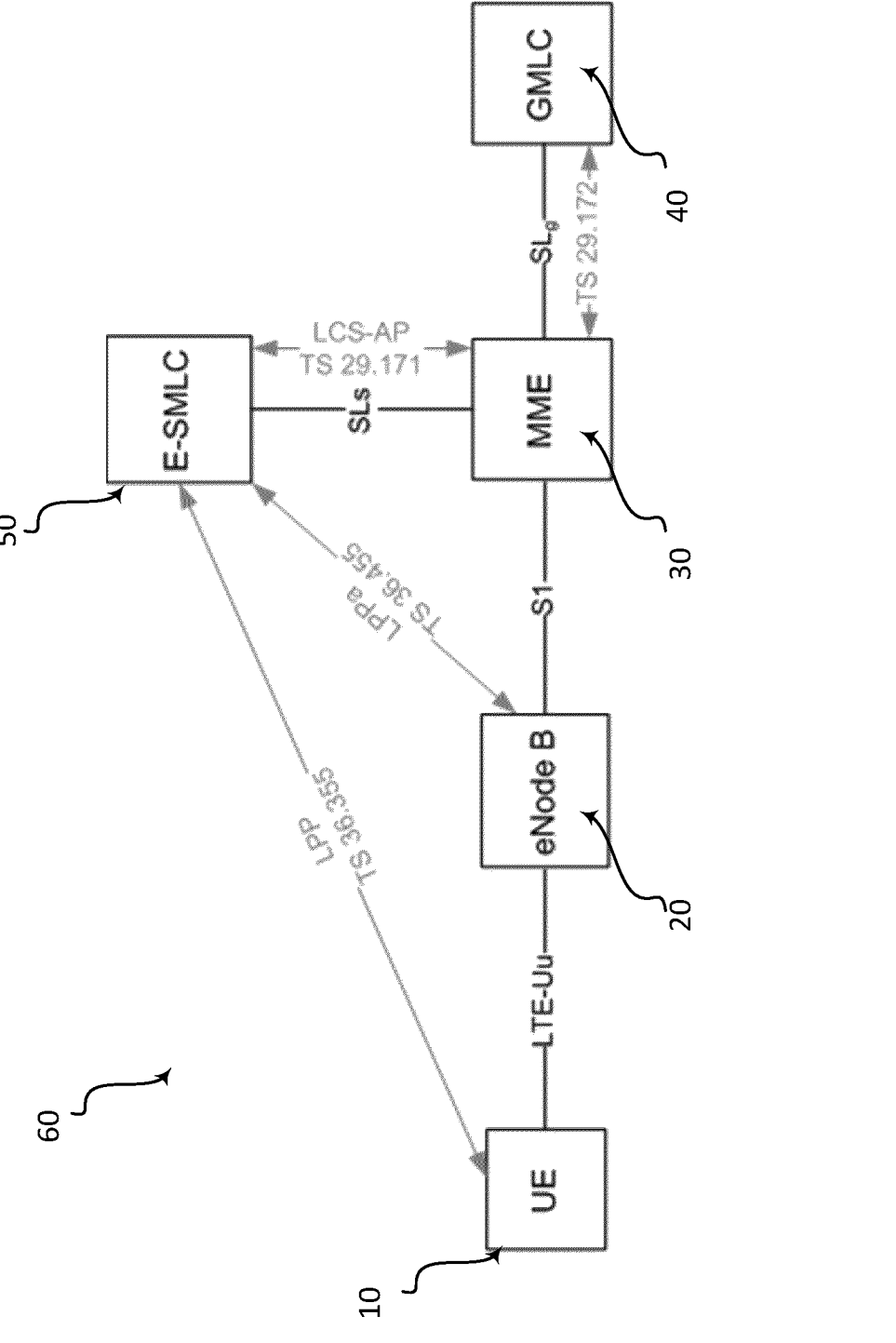
FIG. 1 is a block diagram illustrating positioning architecture.
Figure 2:
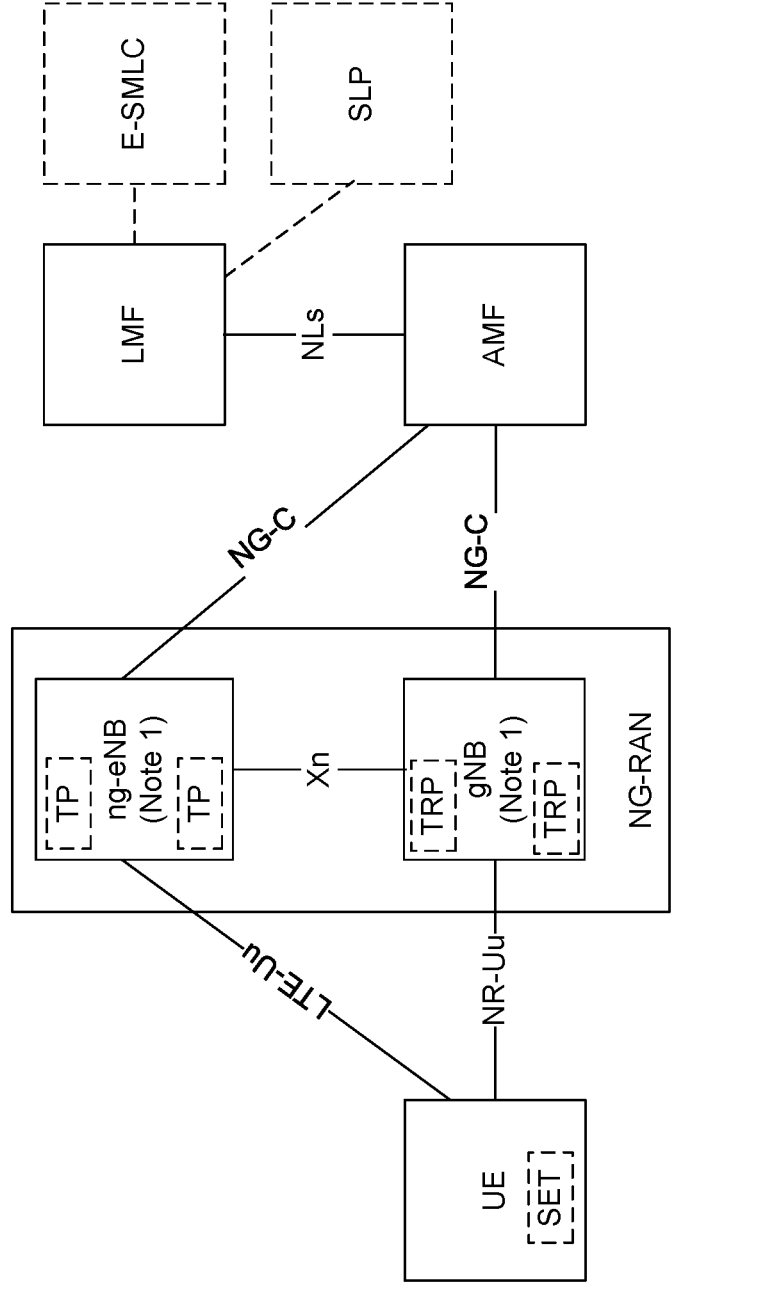
FIG. 2 is a block diagram illustrating an alternative positioning architecture.
Figure 3:
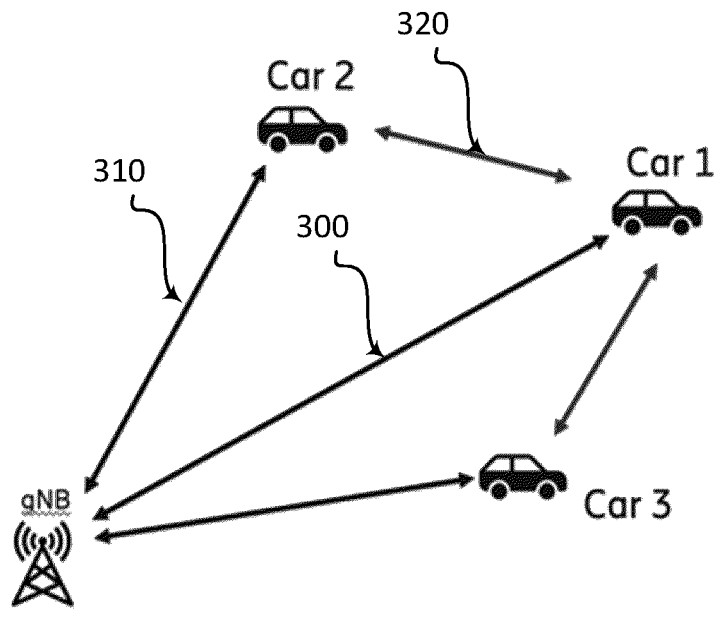
FIG. 3 is an example scenario according to one or more embodiments of the present disclosure.

In one example, with reference to FIG. 3, the following procedure is performed for localizing the Car1 while in the vicinity of other cars, e.g. Car2 and Car3.

1. A gNB and Car1 perform an RTT exchange 300.

2. Another car in the vicinity, Car2 listening to this exchange. Car2 collects RSTD measurements of the signals received from gNB 310 and Car1 320.

3. Car2 knows its position (while also doing the tracking) with certain accuracy (e.g. a certain confidence or estimation error). It may also know its own distribution of its position estimation error.

4. Car2 reports the collected RSTD measurements, its own estimated position and distribution of its own position estimation error to the network.

In some examples Car3 in the picture also performs the same procedures above as described for Car2. The network thus receives the additional information from Car2 and Car3 comprising RSTD measurements derived from the RTT exchange between Car1 and the network and performs additional algorithms to more accurately predict the location of the Car1.

The above concept can also be extended to other positioning methods such as uTDOA (Uplink TDOA) as well, or any positioning scheme involving uplink signal transmission.

In certain embodiments a plurality of cars are in communication with each other, either explicitly via established sidelink connections or being explicitly configured to overhear each other's positioning measurements and/or reporting or implicitly by eavesdropping on the measurement reporting.

In another example the following procedures are performed:

1. Configuration signaling is sent from a gNB to at least one wireless device (e.g. Car2) of how to receive RTT signaling exchange with Car1. This configuration can include time and frequency resources, for both reference signals and control signals. Also, reference signals parameters such as pseudo random seeds and control signals configurations such as scrambling codes, transport block size etc.

2. Configuration of at least Car2 of how to report the measurements from the RTT as well as its own positioning and its own positioning estimation error.

3. Car2 performs Sidelink based measurements—RSTD measurements involving TOA (Timing Of Arrival) measurement from the neighbouring wireless devices, e.g. Car1

4. Car 2 then transmits the further positioning information to the gNB—communicating measurements and its own position estimate along with distribution of its own position estimation error.

5. The configured wireless device(s), e.g. Car2, Car3, overhear RTT measurements from Car1. Car1 may not transmit the signal with the intention of the signal being received by the other wireless devices in its vicinity (Car2 and Car3), necessarily. But because Car2 and Car3 are in the vicinity they can overhear and perform the necessary measurements.

The procedures described above are particularly advantageous for positioning rapidly moving vehicular based wireless devices such as a car. The positioning information comprises, among others, velocity of the vehicle which is obtained through one or more means for example the cars own speedometer and/or GPS. Such vehicle specific information shared between the cooperating or overhearing wireless devices enables vehicular specific positioning estimation enhancements due to relative velocity calculations and predictions of subsequent positioning measurements based on the obtained velocity information. For example, a wireless device may select which other wireless devices (cars) to overhear and/or perform measurements on overheard RTT exchanges based on predicted next location during its next measurement gap.

Figure 4:
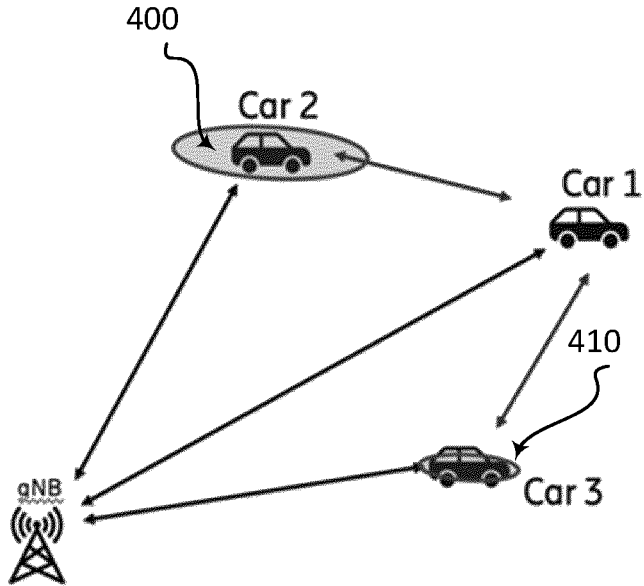
FIG. 4 is a further example scenario according to one or more embodiments of the present disclosure.
block diagram illustrating position reference signaling resources.

As can be seen in FIG. 4, Car2 and Car3 have certain positioning errors, shown by an error ellipse around them, 400, 410. These error ellipses show the uncertainty of their own position estimates. Car2 and Car3 may obtain an estimate of their own position from various sources. The possible sources can be GNSS, inertial sensors in the cars, network-based positioning etc. As can be seen from the FIG. 0.4, the error ellipse at Car2 400 is greater than error ellipse at Car3 410. The uncertainties in their own position estimates are according to the sizes of the error ellipses, in other words the error ellipse depicts the area in which the wireless device, e.g. Car3, Car3 is known to be located.

Figure 5:
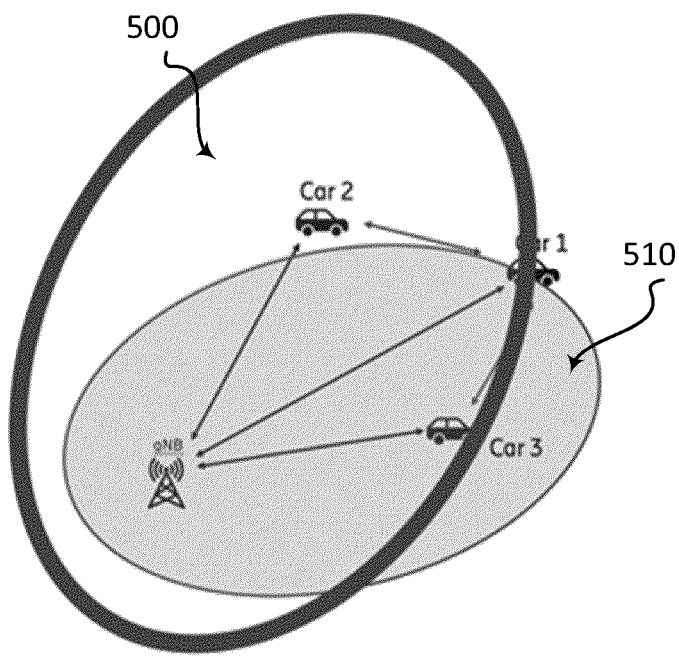
FIG. 5 is a further example scenario according to one or more embodiments of the present disclosure.
is a graph depicting a network node clock characteristic in relation to UTC.

FIG. 5 shows another example of positioning ellipses formed from measurements at Car2 and Car3. As can be seen, the positioning ellipse formed by RSTD measurements at Car2 has a thicker outer line than the ellipse formed due to measurements at Car3. This indicates that Car3 had lower variance on its own position estimate than Car2.

The measurements from the cars can be communicated to the network to enable the network to perform an enhanced final positioning calculation. In addition or alternatively these measurements can be shared among the wireless devices, e.g. cars to enable enhanced UE based positioning calculations.

The procedures introduced above may be performed by one or more devices or network nodes in a communication system. An example communication system is depicted in FIG. 6.

FIG. 6 depicts a communications system 160 according to embodiments disclosed herein. To support UE-based positioning, PRS are transmitted by network nodes 120a, 120b, 120c (referred to generally as 120) The network nodes may be radio base stations e.g. eNodeB, Transmission-Reception Points (TRP), NR gNB, and assistance data 130 is transmitted by a core network entity 150 such as a positioning server, e.g. an SMLC. The core network entity 150 may alternatively be part of a cloud computing system 140. The assistance data 130 is depicted being transmitted to wireless devices 100a, 100b (referred to generally as 100) via the network nodes 120a, 120b, 120c. The assistance data 130 may be transmitted via only one, serving network node via LPP or may be transmitted via another interface, not shown. The assistance data 130 may include clock parameters to enable the wireless devices 100a, 100b to correct OTDOA calculations due to each base station 120a, 120b, 120c having a local clock which differs from each other, and from the reference UTC time.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. In particular, a network node may be comprised in a non-terrestrial network as part of a wireless communications system. A non-terrestrial network (NTN) comprises communications satellites and network nodes. The network nodes may be terrestrial or satellite based. For example the network node may be a satellite gateway or a satellite based base station, e.g. gNB. Other examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In particular the wireless device may be involved in communication with a non-terrestrial network nodes, such as communications satellites and satellite based gateways or base stations. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

The procedures introduced previously will now be further described in relation to methods and suitable apparatus configured to perform the procedures, In FIG. 7 a method 700 is performed by a wireless device. The method begins with the wireless device receiving 720 a reference signal for an overhearing positioning measurement. In some examples this reference signal is a positioning reference signal (PRS) and in some examples this is transmitted by a network node. In other examples this reference signal may be transmitted on a sidelink resource configured for device to device communication. In certain examples the reference signal is transmitted by a serving network node, which may be a cooperating network node. In this context a cooperating network node is actively configuring the wireless devices which is serves to perform overhearing positioning measurements. As such the method 700 optionally includes step 710 wherein the wireless device receives configuration information to configure the device to perform or support neighbouring wireless device overhearing positioning measurements. In some examples the reference signal is received from a non-serving network node, in which case the overheard positioning measurement exchanges may be considered not to be cooperated or may be termed eavesdropping measurements.

The method proceeds at step 730 with the wireless device receiving a positioning measurement from a neighbouring wireless device wherein the measurement is performed by the neighbouring wireless device. In some examples the wireless device overhears the positioning measurement report which is determined to be in response to the same reference signal received by the wireless device at step 720. In some examples where the wireless device is configured to perform the overhearing positioning this is determined based on the configuration information received at step 710. In other examples where the overhearing is performed without cooperation from the network node this may be determined by other means such as information in the received signals and measurement reports.

The method continues with the wireless device determining at step 740 further positioning information (overhearing) from the received reference signal and the received overhearing positioning measurement. For example, the wireless device performs a time difference measurement on the received reference signal (RSTD, uTDOA etc) and the reported RTT measurement. In some examples the wireless device is able to read the reported RTT from the neighbouring wireless device and use the measurement information to determine the further positioning information.

The wireless device may use the determined positioning information to enhance estimation accuracy of its own location. In particular if the wireless device also has further positioning information about the neighbouring wireless device from which it performed the overhearing measurements. In some examples this information is obtained from the configuration information received in step 710 when a cooperating network node provides such information. In certain examples the wireless device receives at step 750 further positioning information from neighbouring wireless devices. This information may comprise own determined location information of cooperating wireless devices based on various means such as GNSS and/or network based positioning methods. In some examples the further information comprises overhearing positioning measurements. In yet further examples the overhearing positioning measurements received from the neighbouring wireless device are measurements made by the neighbouring wireless device performed with respect to an RTT measurement exchange made by the present wireless device and its serving network node. The method may optionally include the wireless device transmitting at step 760 further positioning information. In some examples the further positioning information is transmitted to a serving (cooperating) network node. In some examples the wireless device transmits the further positioning information to neighbouring wireless devices. These procedures are not exclusive to each other, for example the wireless device may transmit the same information to the served network node as to other wireless devices or simply the same signal can be detected by the other wireless devices or in other examples separate messages are transmitted wherein some the information may be the same or a subset of the information is provided. For example, the wireless device may provide its own positioning/location information in combination with overhearing positioning information. The wireless device may have determined its location through other procedures such as UE based positioning or GNSS etc. The information may also comprise accuracy information of the wireless device's own position and other information known to the wireless device which is relevant to its vehicular nature such as velocity and tracking information. In addition or alternatively the information may comprise other neighbouring wireless device's information, in particular if received, for example at step 750, from a neighbouring wireless device. Such information may comprise the current velocity of the neighbouring device or devices, tracking information of the neighbouring device or devices, relative velocity and/or relative position information with respect to the wireless device and/or with respect to other neighbouring wireless devices.

Tracking information may comprise information derived from, for example the GNSS network. In some examples the tracking information comprises information of where a device has been, e.g. previous locations over a predefined period of time, current location and predicted future locations (e.g. arrival time/destination).

The method 700 may be understood by those skilled in the art to be enable a wireless device to perform multiple overhearing positioning measurements on a plurality of neighbouring wireless devices. The wireless device may be a vehicular based device travelling at speed surrounded by other wireless devices, in particular other vehicles also travelling at speed, but not limited to vehicular devices, and may receive a plurality of messages providing further positioning information from the plurality of neighbouring devices. As a result the wireless device can determine enhanced positioning information on its own location and estimation accuracy and its neighbouring wireless device's positions and estimation accuracies. Algorithms for predicting position ellipses may be reused or new algorithms developed as a result of the additional information provided by the embodiments disclosed herein. In some examples the network nodes such as location servers or other applications perform the location algorithms. In some examples the wireless devices may perform their own (UE based) operations to determine or predict positioning ellipses. These location estimations may be shared between cooperating wireless devices to provide enhanced positioning accuracy for each of the involved devices.

In some examples the further positioning information is determined based on one or more deltas between the first positioning information and the third positioning information from the neighbouring wireless device.

In some examples the wireless device may use a different radio/antenna/RAT to communicate with neighbouring wireless devices such as cars and the network. For example the communication with the network may be over licensed spectrum and the communication between vehicles could be over unlicensed spectrum.

In some examples the wireless device receives from the network a list of neighbouring wireless devices such as cars and request a measurements on signals of their neighbouring cars.

In some examples wireless devices (e.g. cars) share uncertainties of their positioning related measurements to the network and to the neighbouring cars.

In some examples the wireless device provides a list of its neighbouring cars to the network, for example to enable the network to determine whether specific/targeted overhearing should be performed or to take the known position of the indicated neighbouring devices into account for enhancing the positioning accuracy of one or more of the identified devices. In some examples the wireless devices (e.g. cars) and network perform tracking movement of other devices (neighbouring vehicular devices) using the provided measurements and uncertainty information.

The optional step of receiving configuration information 710 may include receiving at least one of: measurement reception configuration for receiving measurement reports from neighbouring wireless devices; measurement reporting configuration for detection by neighbouring wireless devices; an indication corresponding to a neighbouring wireless device for which the overhearing positioning shall be applied. For example, the configuration information may include time and frequency resources, for both reference signals and control signals. Also, reference signals parameters such as pseudo random seeds and control signals configurations such as scrambling codes, transport block size etc.

In some examples a user equipment, UE, is configured to perform any of the methods described above in relation to the method of FIG. 7.

In FIG. 8 and method 800 performed by a network node is provided. The method begins with the network node receiving at step 820 overhearing positioning information from a wireless device, for example positioning information based on overheard positioning reports. The positioning information may comprise one or more positioning measurements, such as RSTD measurements of a reference signal and corresponding round trip time response overheard or received by the wireless device from a neighbouring wireless device. In some examples the positioning information includes additional positioning information such the location of the wireless device. In some examples the location is obtained by other means such as GNSS. In certain examples the overhearing positioning information is combined with a measurement report of measurements performed for the location of the wireless device itself, such as an RTT measurement in response to a detected PRS. In some examples the positioning information includes other information, in particular information relevant to a vehicular based wireless device such as velocity information and/or tracking information. In some examples the positioning information may comprise predictions of positioning ellipses corresponding to the wireless device and/or the neighbouring devices to the wireless device. Other information which may be included is the estimation accuracies, variance or confidence of the positioning information.

In an optional step of the method 800, the network node may transmit at step 810 configuration information for performing overhearing positioning information. The configuration information may be sent in a dedicated manner to configure a wireless device to perform overhearing or support neighbouring wireless devices perform overhearing positioning measurements. In other examples, or in addition, the network node may broadcast the configuration to enable all wireless devices in the cell to provide overhearing positioning support. The configuration information may include at least one of: measurement reception configuration for a wireless device to receive or overhear measurement reports from neighbouring wireless devices; measurement reporting configuration for detection or overhearing by neighbouring wireless devices; an indication corresponding to a neighbouring wireless device for which the wireless device is to perform overhearing positioning. For example, the configuration information may include time and frequency resources, for both reference signals and control signals. Also, reference signals parameters such as pseudo random seeds and control signals configurations such as scrambling codes, transport block size etc.

In some examples the configuration is transmitted to a wireless device, e.g. a car, to transmit its signals which are part of the RTT procedure with as wide beams as possible. This as an indication that it is not only the network node, e.g. the gNB, which will receive the RTT exchange, but also possible surrounding wireless devices, e.g. other cars, with positions unknown to the first wireless device.

The method 800 may be understood by those skilled in the art to enable one or more wireless devices to perform multiple overhearing positioning measurements on a plurality of neighbouring wireless devices. The wireless device may be a vehicular based device travelling at speed surrounded by other wireless devices, in particular other vehicles also travelling at speed, but not limited to vehicular devices, and may receive a plurality of messages providing further positioning information from the plurality of neighbouring devices. As a result the wireless devices can determine enhanced positioning information on their own location and estimation accuracy and their neighbouring wireless device's positions and estimation accuracies. Algorithms for predicting position ellipses may be reused or new algorithms developed as a result of the additional information provided by the embodiments disclosed herein. In some examples other network nodes such as location servers or other applications perform the location algorithms. In which case the network node performing the method 800, for example a base station or gNB, may provide the received positioning information to other network nodes/servers. In some examples the wireless devices may perform their own (UE based) operations to determine or predict positioning ellipses. These location estimations may be shared between cooperating wireless devices to provide enhanced positioning accuracy for each of the involved devices.

In some examples a base station, e.g. eNB or gNB is configured to perform any of the methods described above in relation to the method of FIG. 8.

FIG. 9 is a block diagram of the network node 900 constructed in accordance with principles set forth herein. Said network node 900 is suitable for providing positioning reference signals, PRS and, in particular, for receiving positioning information comprising overhearing positioning measurements. The network node 900 is configured to perform any of the methods disclosed herein relevant to a network node. The network node 900 includes processing circuitry 910 which may comprise one or more processors. The network node 900 further comprises a computer readable storage medium in the form of a memory 920, the memory 920 containing instructions which, when executed by the processing circuitry 910, configures the processing circuitry 910 to perform the one or more methods described herein. The memory 920 may comprise a computer program 930, comprising instructions which, when executed by the processing circuitry 910, configures the processing circuitry 910 to perform the one or more methods described herein In addition or alternatively to a traditional processor and memory, processing circuitry 910 may comprise integrated circuitry for processing and/or control, e.g., one or more processors and/or processor cores and/or FPGAs (Field Programmable Gate Array) and/or ASICs (Application Specific Integrated Circuitry).

Processing circuitry 910 may include and/or be connected to and/or be configured for accessing (e.g., writing to and/or reading from) memory 920, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 920 may be configured to store code executable by control circuitry and/or other data, e.g., data pertaining to communication, e.g., configuration and/or address data of nodes, etc. Processing circuitry 910 may be configured to control any of the methods described herein and/or to cause such methods to be performed. Corresponding instructions may be stored in the memory 920, which may be readable and/or readably connected to the processing circuitry 910. In other words, processing circuitry 910 may include a controller, which may comprise a microprocessor and/or microcontroller and/or FPGA (Field-Programmable Gate Array) device and/or ASIC (Application Specific Integrated Circuit) device. It may be considered that processing circuitry 910 includes or may be connected or connectable to memory, which may be configured to be accessible for reading and/or writing by the controller and/or processing circuitry 910.

The network node 900 also includes transceiver circuitry 940 for transmission and reception over a wireless connection. An example of such transmission for this disclosure is the transmission of positioning reference signalling, configuration information for enabling cooperative overhearing positioning measurement. An example of such reception for this disclosure is receiving radio resource control signaling from a wireless device, positioning information comprising overhearing positioning measurements. The transceiver circuitry may include a number of antennas suitable for wireless connectivity with one or more radio access types, e.g. LTE, NR.

In some embodiments the network node 900 is configured to receive via the transceiver circuitry 940 positioning information from a wireless device, the positioning information comprising overhearing positioning information based on overheard positioning exchanges from one or more neighbouring wireless devices.

FIG. 10 is a block diagram of a wireless device 1000 constructed in accordance with principles set forth herein. Said wireless device 1000 is suitable for determining positioning information, for example based on observed time difference of arrival and RTT. The wireless device 1000 is configured to perform any of the methods disclosed herein relevant to a wireless device. The wireless device 1000 includes processing circuitry 1010 which may comprise one or more processors The wireless device 1000 further comprises a computer readable storage medium in the form of a memory 1020, the memory 1020 containing instructions which, when executed by the processing circuitry 1010, configures the processing circuitry 1010 to perform the one or more methods described herein. The memory 1020 may comprise a computer program 1030, comprising instructions which, when executed by the processing circuitry 1010, configures the processing circuitry 1010 to perform the one or more methods described herein In addition or alternatively to a traditional processor and memory, processing circuitry 1010 may comprise integrated circuitry for processing and/or control, e.g., one or more processors and/or processor cores and/or FPGAs (Field Programmable Gate Array) and/or ASICs (Application Specific Integrated Circuitry).

Processing circuitry 1010 may include and/or be connected to and/or be configured for accessing (e.g., writing to and/or reading from) memory 1020, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 1020 may be configured to store code executable by control circuitry and/or other data, e.g., data pertaining to communication, e.g., configuration and/or address data of nodes, etc. Processing circuitry 1010 may be configured to control any of the methods described herein and/or to cause such methods to be performed. Corresponding instructions may be stored in the memory 1020, which may be readable and/or readably connected to the processing circuitry 1010. In other words, processing circuitry 1010 may include a controller, which may comprise a microprocessor and/or microcontroller and/or FPGA (Field-Programmable Gate Array) device and/or ASIC (Application Specific Integrated Circuit) device. It may be considered that processing circuitry 1010 includes or may be connected or connectable to memory, which may be configured to be accessible for reading and/or writing by the controller and/or processing circuitry 1010.

The wireless device 1000 also includes transceiver circuitry 1040 for transmission and reception over a wireless connection. Examples of such reception for this disclosure is the reception of positioning reference signalling, measurements on which to perform overhearing and reception of configuration information. An example of such transmission for this disclosure is transmission of further positioning information, e.g. comprising overhearing positioning measurements, other measurement reports such as RTT reporting. The transceiver circuitry may include a number of antennas suitable for wireless connectivity with one or more radio access types, e.g. LTE, NR, WiFi.

In some embodiments the wireless device 1000 is configured to receive, via the transceiver circuitry 1040 a reference signal and perform a positioning measurement based on the received reference signal and receive, via the transceiver circuitry 1040, positioning information based on the first reference signal; and the processing circuitry 1010 configured to determine further positioning information based on the positioning measurement and the received positioning information.

FIG. 11 is a block diagram of an alternative embodiment of a wireless device 1100 suitable for determining position based on observed time difference of arrival. The wireless device 1100 is configured to perform any of the methods disclosed herein relevant to a wireless device. The wireless device 1100 may comprise function modules configured to execute one or more of the methods described herein, for example according to computer readable instructions received from a computer program. It will be understood that the modules may be software implemented functional units, and may be realised in any appropriate combination of software. For example, the transmitting and receiving module 1110 comprises instructions to receiving a first reference signal and receiving a first positioning information based on the first reference signal. In some embodiments the transmitting and receiving module 1110 further comprises instructions for transmitting positioning information comprising overhearing positioning information and optionally for receiving configuration information. The positioning computation module 1120 comprises instructions for performing a first positioning measurement based on the received first reference signal and determining further positioning information based on the first positioning measurement and the received first measurement report.

FIG. 12 is a block diagram of an alternative embodiment of a network node 1200 suitable for providing positioning reference signal, PRS and, in particular, for receiving overhearing positioning measurement information and configuring overhearing positioning. The network node 1200 is configured to perform any of the methods disclosed herein relevant to a network node. The network node 1200 may comprise function modules configured to execute one or more of the methods described herein, for example according to computer readable instructions received from a computer program. It will be understood that the modules may be software implemented functional units and may be realised in any appropriate combination of software. For example, the receiving and transmitting module 1210 comprises instructions for transmission of at least one positioning reference signal, receiving positioning measurement information from a wireless device, the positioning information comprising overhearing positioning information based on received or overheard positioning information exchanges from one or more neighbouring wireless devices. Additionally, the receiving and transmitting module 1210 may comprise instructions for transmission of configuration information. The configuration information may be derived in the overhearing configuration module 1220, and for example comprise measurement reception configuration for the wireless device to receive measurement reports comprising positioning information from neighbouring wireless devices; measurement reporting configuration for the wireless device to transmit measurement reports comprising positioning information to neighbouring wireless devices; or an indication corresponding to a neighbouring wireless device from which a measurement report is to be received.

A further aspect of the disclosure provides a carrier containing a computer program comprising instructions which, when executed on at least one processor, cause the at least one processor to carry out the method according to any example.

With reference to FIG. 13, in accordance with an embodiment, a communication system includes a telecommunication network 3210, such as a 3GPP-type cellular network, which comprises an access network 3211, such as a radio access network, and a core network 3214. The access network 3211 comprises a plurality of network nodes or base stations 3212a, 3212b, 3212c, such as NBs, eNBs, gNBs or other types of wireless access points, each defining a corresponding coverage area 3213a, 3213b, 3213c. Each network node or base station 3212a, 3212b, 3212c is connectable to the core network 3214 over a wired or wireless connection 3215. A first wireless device 3291 located in coverage area 3213*c* is configured to wirelessly connect to, or be paged by, the corresponding base station 3212*c*. A second wireless device 3292 in coverage area 3213*a* is wirelessly connectable to the corresponding base station 3212*a*. While a plurality of wireless devices 3291, 3292 are illustrated in this example, the disclosed embodiments are equally applicable to a situation where a sole wireless device is in the coverage area or where a sole wireless device is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 13 as a whole enables connectivity between one of the connected wireless devices 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as interme-diaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodi-ment, of the UE, base station and host computer discussed in the preceding paragraphs will now be described with reference to FIG. 14. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing cir-cuitry 3318 may comprise one or more programmable processors, application-specific integrated circuits, field pro-grammable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be oper-able to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 33) served by the base station 3320. The communication interface 3326 may be configured to facili-tate a connection 3360 to the host computer 3310. The connection 3360 may be direct or it may pass through a core network (not shown in FIG. 33) of the telecommunication system and/or through one or more intermediate networks outside the telecommunication system. In the embodiment shown, the hardware 3325 of the base station 3320 further includes processing circuitry 3328, which may comprise one or more programmable processors, application-specific inte-grated circuits, field programmable gate arrays or combina-tions of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more program-mable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client appli-cation 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 21 may be identical to the host computer 3230, one of the base stations 3212*a*, 3212*b*, 3212*c* and one of the UEs 3291, 3292 of FIG. 20, respec-tively. This is to say, the inner workings of these entities may be as shown in FIG. 21 and independently, the surrounding network topology may be that of FIG. 20.

In FIG. 14, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the radio network security and integrity and thereby provide benefits such as simplified security procedures for accessing OTT services. In addition a number of the embodiments disclosed herein may be applied via the host computer 3310, for example the provision of timing difference information and checking UE access capabilities for provision of UE based provisioning "as-a-service". OTT features which rely on positioning may receive more accurate positioning information directly from the wireless device rather than via the location server (UE assisted positioning). This improves the latency for such OTT services and potentially reduces the number of positioning measurements a UE would need to perform, reducing the power consumption and processing load.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 15, 16:
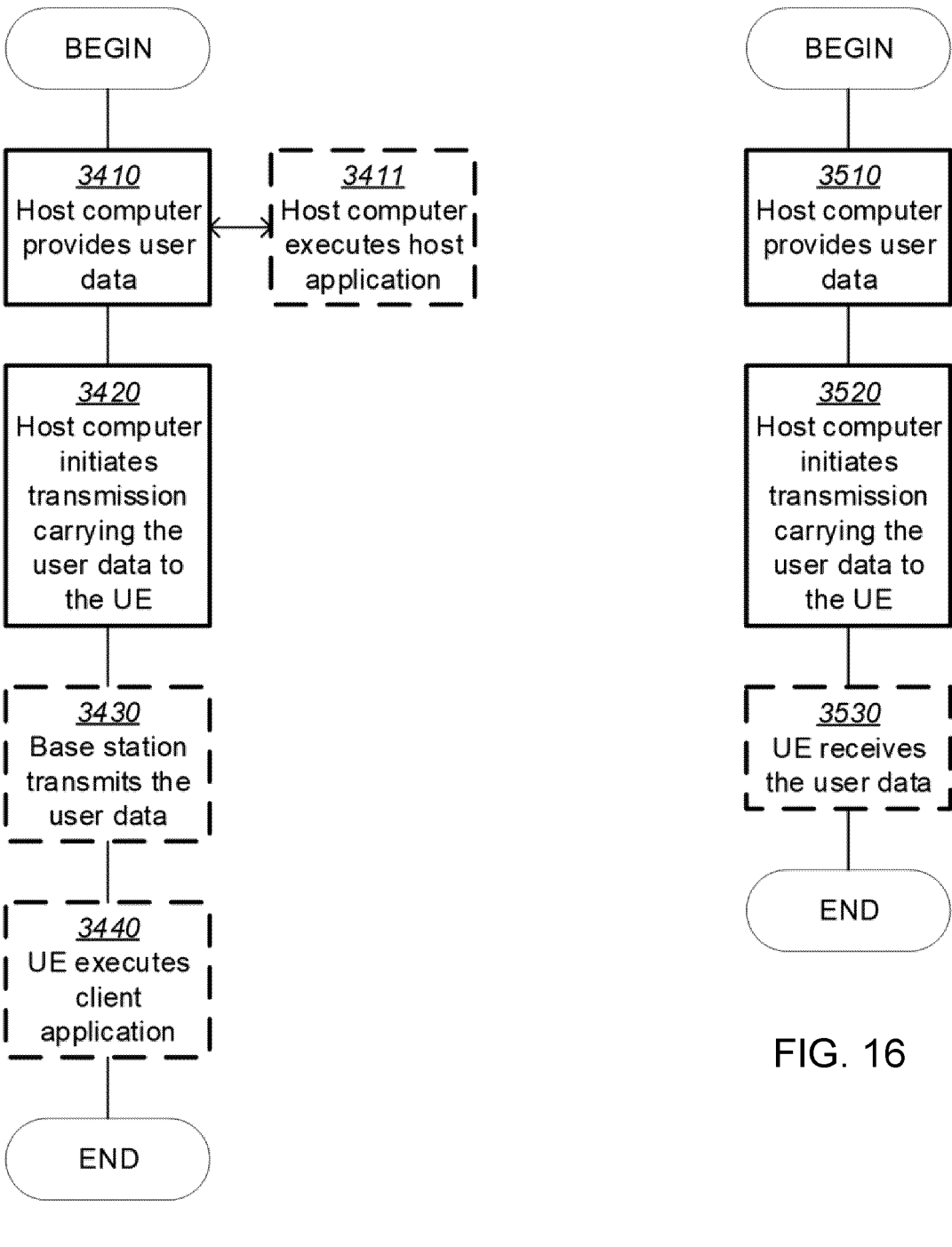

FIG. 15 is a flowchart illustrating a method implemented in a communication system, in accordance with one embodiment. The communication system includes a host computer, a base station and a wireless device or UE which may be those described with reference to FIGS. 13 and 14. For simplicity of the present disclosure, only drawing references to FIG. 15 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 16 is a flowchart illustrating a method implemented in a communication system, in accordance with one embodiment. The communication system includes a host computer, a base station and a wireless device or UE which may be those described with reference to FIGS. 13 and 14. For simplicity of the present disclosure, only drawing references to FIG. 16 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 17 is a flowchart illustrating a method implemented in a communication system, in accordance with one embodiment. The communication system includes a host computer, a base station and a wireless device or UE which may be those described with reference to FIGS. 13 and 14. For simplicity of the present disclosure, only drawing references to FIG. 17 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a wireless device or UE which may be those described with reference to FIGS. 13 and 14. For simplicity of the present disclosure, only drawing references to FIG. 18 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It should be noted that the above-mentioned examples illustrate rather than limit the invention, and that those skilled in the art will be able to design many alternative embodiments without departing from the scope of the appended embodiments. The word "comprising" does not exclude the presence of elements or steps other than those listed in a embodiment, "a" or "an" does not exclude a plurality, and a single processor or other unit may fulfil the functions of several units recited in the embodiments. Any reference signs in the embodiments shall not be construed so as to limit their scope.

NUMERATED EXAMPLES

Example 1. A method for determining positioning performed by a wireless device, the method comprising: receiving a reference signal and performing a positioning measurement based on the received first reference signal; receiving positioning information based on the reference signal; determining further positioning information based on the positioning measurement and the received positioning information.

Example 2. The method according to Example 1, wherein the reference signal is a positioning reference signal received from a network node.

Example 3. The method according to Example 1, wherein the reference signal is a positioning reference signal received from a neighbouring wireless device.

Example 4. The method according to Examples 1 to 3, wherein the received positioning information comprises a round trip time measurement received from a neighbouring wireless device.

Example 5. The method according to any one of the preceding Examples, wherein the received positioning information comprises positioning information determined by a neighbouring wireless device overhearing positioning signalling exchanges from other neighbouring wireless devices.

Example 6. The method according to Example 5, wherein the overheard positioning signalling exchanges correspond to positioning measurements performed by the wireless device.

Example 7. The method according to any one of the preceding Examples, wherein the received positioning information includes an estimation error corresponding to a reported positioning measurement.

Example 8. The method according to any one of the preceding Examples, wherein the determined further positioning information comprises at least one of: a velocity; a relative velocity; a relative position of the wireless device to a neighbouring wireless device; an estimation error; one or more neighbouring wireless device positioning information.

Example 9. The method according to any one of the preceding Examples, wherein the performed positioning measurement is a reference signal received time difference, RSTD measurement.

Example 10. The method according to any one of the preceding Examples further comprising: transmitting positioning information comprising the determined further positioning information.

Example 11. The method of Example 10, wherein the transmitted positioning information further comprises own location information of the wireless device, e.g. based on GNSS.

Example 12. The method of Examples 10 or 11, wherein the transmitted positioning information is transmitted to a serving network node.

Example 13. The method according to any one of the preceding Examples, further comprising: receiving from a serving network node configuration information comprising at least one of: measurement reception configuration for receiving measurement reports from neighbouring wireless devices; measurement reporting configuration for detection by neighbouring wireless devices; an indication corresponding to a neighbouring wireless device from which the first measurement report is to be received.

Example 14. The method according to any one of the preceding Examples, further comprising: receiving a plurality of measurement reports and the determining further positioning information being based on the plurality of measurement reports.

Example 15. The method according to any one of the preceding Examples, further comprising receiving a third measurement report comprising third positioning information from a neighbouring wireless device wherein both the wireless device and the neighbouring wireless device are moving and wherein the further positioning information is determined based on one or more deltas between the first positioning information and the third positioning information from the neighbouring wireless device.

Example 16. The method according to any one of Examples 10 to 15, further comprising: transmitting a measurement report comprising tracking information corresponding to the neighbouring device based on the one or more deltas between the first and third positioning information from the neighbouring wireless device.

Example 17. A method performed by a network node, the method comprising: receiving positioning information from a wireless device, the positioning information comprising overhearing positioning information based on overheard positioning exchanges from one or more neighbouring wireless devices.

Example 18. The method according to Example 17, further comprising: transmitting configuration information comprising at least one of: measurement reception configuration for a wireless device to receive measurement reports comprising positioning information from neighbouring wireless devices; measurement reporting configuration for a wireless device to transmit measurement reports comprising positioning information to neighbouring wireless devices; an indication corresponding to a neighbouring wireless device from which a measurement report is to be received;

Example 19. A wireless device comprising processor circuitry, memory and transceiver circuitry, the processor circuitry configured to: receive, via the transceiver circuitry, a reference signal and perform a positioning measurement based on the received reference signal; receive, via the transceiver circuitry, positioning information based on the first reference signal; and determine further positioning information based on the positioning measurement and the received positioning information.

Example 20. The wireless device of Example 19, wherein the processor circuitry is further configured to perform any one of the methods of Examples 2 to 16.

Example 21. The wireless device of Examples 19 to 20, wherein the wireless device is a vehicular based device.

Example 22. A network node comprising processor circuitry, memory, and transceiver circuitry, the processor circuitry configured to receive, via the transceiver circuitry, positioning information from a wireless device, the positioning information comprising overhearing positioning information based on overheard positioning exchanges from one or more neighbouring wireless devices.

Example 23. The network node of Example 22, wherein the processor circuitry is further configured to transmit configuration information comprising at least one of: measurement reception configuration for a wireless device to receive measurement reports comprising positioning information from neighbouring wireless devices; measurement reporting configuration for a wireless device to transmit measurement reports comprising positioning information to neighbouring wireless devices; an indication corresponding to a neighbouring wireless device from which a measurement report is to be received;

Example 24. The network node of Example 22 or 23, wherein the network node is a gNB or eNB.

Example 25. A User Equipment, UE, configured to perform any one of Examples 1 to 16.

Example 26. A base station configured to perform any one of Examples 17 to 18.

Example 27. A system for determining positioning information, the system comprising one or more network nodes and a plurality of wireless devices, wherein one or more of the plurality of wireless devices receives a reference signal and performs a positioning measurement based on the received reference signal and receives positioning information based on the received reference signal; the one or more wireless device determines further positioning information based on the positioning measurement and the received positioning information and transmits the determined further positioning information to one or more of the plurality of wireless devices and/or to the one or more network nodes; and the one or more network nodes and/or wireless devices determining enhanced positioning accuracy of predetermined positioning estimates based on the received further positioning information.

Example 28. The system of Example 27, wherein the enhanced positioning accuracy comprises ellipse predictions of positioning estimates with reduced variance.

Example 29. The system of Examples 27 or 28, further incorporating any one of Examples 1 to 18.

Example 30. A computer program, program product, carrier or medium comprising instructions which when executed on a computer processor, cause the processor to perform any one of Examples 1 to 18.

ABBREVIATIONS

5GC 5G Core Network
5GS 5G System
A-AoA Azimuth of Arrival
ADR Accumulated Delta Range
AoA Angle of Arrival
AP Access Point
ARP Antenna Reference Point
BDS BeiDou Navigation Satellite System
BSSID Basic Service Set Identifier
CID Cell-ID (positioning method)
CLAS Centimetre Level Augmentation Service
DL-AoD Downlink Angle-of-Departure
DL-TDOA Downlink Time Difference Of Arrival
E-SMLC Enhanced Serving Mobile Location Centre
E-CID Enhanced Cell-ID (positioning method)
ECEF Earth-Centered, Earth-Fixed
ECI Earth-Centered-Inertial
EGNOS European Geostationary Navigation Overlay Service
E-UTRAN Evolved Universal Terrestrial Radio Access Network
FDMA Frequency Division Multiple Access
FKP Flächenkorrekturparameter (Engl: Area Correction Parameters)
GAGAN GPS Aided Geo Augmented Navigation GLONASS GLObal'naya NAvigatsionnaya Sputnikovaya Sistema (Engl.: Global Navigation Satellite System)
GMLC Gateway Mobile Location Center
GNSS Global Navigation Satellite System
GPS Global Positioning System
GRS80 Geodetic Reference System 1980
HESSID Homogeneous Extended Service Set Identifier
LCS LoCation Services
LMF Location Management Function
LPP LTE Positioning Protocol
MAC Master Auxiliary Concept
MBS Metropolitan Beacon System
MO-LRMobile Originated Location Request
MT-LR Mobile Terminated Location Request
Multi-RTT Multi-Round Trip Time
NG-C NG Control plane
NG-AP NG Application Protocol
NI-LR Network Induced Location Request
N-RTK Network-Real-Time Kinematic
NRPPa NR Positioning Protocol A
OTDOA Observed Time Difference Of Arrival
PDU Protocol Data Unit
posSlBPositioning SIB
PPP Precise Point Positioning
PPP-RTK Precise Point Positioning-Real-Time Kinematic
PRS Positioning Reference Signal (for E-UTRA)
QZSS Quasi-Zenith Satellite System
RP Reception Point
RRM Radio Resource Management
RSRP Reference Signal Received Power
RSSI Received Signal Strength Indicator
RSTD Reference Signal Time Difference
RTK Real-Time Kinematic
SBAS Space Based Augmentation System
SET SUPL Enabled Terminal
SIB System Information Block
SLP SUPL Location Platform
SSID Service Set Identifier
SSR State Space Representation
STEC Slant TEC
SUPL Secure User Plane Location
TADV Timing Advance
TBS Terrestrial Beacon System
TEC Total Electron Content
TP Transmission Point
TRP Transmission-Reception Point
UE User Equipment
UL-RTOA Uplink Relative Time of Arrival
UL-TDOA Uplink Time Difference of Arrival
URA User Range Accuracy
WAAS Wide Area Augmentation System
WGS-84 World Geodetic System 1984
WLAN Wireless Local Area Network
Z-AoA Zenith Angles of Arrival

The invention claimed is:

1. A method for determining positioning performed by a wireless device, the method comprising:
receiving a reference signal and performing a positioning measurement based on the received reference signal;
receiving first positioning information based on the reference signal, wherein the received first positioning information comprises a positioning measurement reported by a neighboring wireless device performed on the reference signal, wherein the reported positioning measurement is reported by the neighboring wireless device to a network node and the receiving of the first positioning information comprises overhearing the positioning measurement report;

determining further positioning information based on the positioning measurement and the received first positioning information.

2. The method according to claim 1, wherein the reference signal is a positioning reference signal received from at least one of a network node and a neighboring wireless device and the received first positioning information comprises at least one of:

a round trip time measurement performed by the neighboring wireless device; and a reference signal received time difference, RSTD measurement.

3. The method according to claim 1 wherein the received first positioning information comprises positioning information determined by a neighboring wireless device overhearing positioning signaling exchanges from other neighboring wireless devices.

4. The method according to claim 3, wherein the overheard positioning signaling exchanges correspond to positioning measurements performed by the wireless device.

5. The method according to claim 1, wherein the received first positioning information includes an estimation error corresponding to a reported positioning measurement.

6. The method according to claim 1, wherein the determined further positioning information comprises at least one of:

a velocity;

a relative velocity;

a relative position of the wireless device to a neighboring wireless device;

an estimation error;

one or more neighboring wireless device positioning information.

7. The method according to claim 1 further comprising:

transmitting positioning information comprising the determined further positioning information wherein the transmitted positioning information further comprises own location information of the wireless device and wherein the transmitted positioning information is transmitted to a serving network node.

8. The method according to claim 1, further comprising:

receiving from a serving network node configuration information comprising at least one of:

measurement reception configuration for overhearing measurement reports from neighboring wireless devices;

measurement reporting configuration for detection by neighboring wireless devices;

an indication corresponding to a neighboring wireless device from which the overheard measurement report is received.

9. The method according to claim 1, further comprising receiving a third measurement report comprising third positioning information from the neighboring wireless device wherein both the wireless device and the neighboring wireless device are moving and wherein the further positioning information is determined based on one or more deltas between the first positioning information and the third positioning information from the neighboring wireless device.

10. The method according to claim 9 further comprising: transmitting a measurement report comprising tracking information corresponding to the neighboring device based on the one or more deltas between the first and third positioning information from the neighboring wireless device.

11. A method performed by a network node, the method comprising:

receiving positioning information from a wireless device, the positioning information comprising overhearing positioning information wherein the overhearing positioning information is based on overheard positioning exchanges detected by the wireless device from one or more neighboring wireless devices.

12. The method according to claim 11, further comprising: transmitting configuration information comprising at least one of:

measurement reception configuration for a wireless device to receive measurement reports comprising overhearing positioning information from neighboring wireless devices;

measurement reporting configuration for a wireless device to transmit measurement reports comprising positioning information to be overheard by neighboring wireless devices;

an indication corresponding to a neighboring wireless device from which an overhearing measurement report is to be received.

13. A wireless device comprising processing circuitry, memory and transceiver circuitry, the processing circuitry configured to:

receive, via the transceiver circuitry, a reference signal and perform a positioning measurement based on the received reference signal;

receive, via the transceiver circuitry, positioning information based on the reference signal wherein the received positioning information comprises a positioning measurement reported by a neighboring wireless device performed on the reference signal, wherein the reported positioning measurement is reported by the neighboring wireless device to a network node and the receiving of the positioning information comprises overhearing the positioning measurement report; and determine further positioning information based on the positioning measurement and the received positioning information.

14. The wireless device of claim 13, wherein the reference signal is a positioning reference signal received from at least one of a network node and a neighboring wireless device and the received positioning information comprises at least one of:

a round trip time measurement performed by the neighboring wireless device; and a reference signal received time difference, RSTD measurement.

15. A network node comprising processing circuitry, memory, and transceiver circuitry, the processor circuitry configured to:

receive, via the transceiver circuitry, positioning information from a wireless device, the positioning information comprising overhearing positioning information based on overheard positioning exchanges detected by the wireless device from one or more neighboring wireless devices.

16. The network node of claim 15, wherein the processing circuitry is further configured to transmit configuration information comprising at least one of:

measurement reception configuration for a wireless device to receive overhearing measurement reports comprising overhearing positioning information from neighboring wireless devices;

measurement reporting configuration for a wireless device to transmit measurement reports comprising positioning information to be overheard by neighboring wireless devices;

an indication corresponding to a neighboring wireless device from which an overhearing measurement report is to be received.

17. A system for determining positioning information, the system comprising one or more network nodes and a plurality of wireless devices, wherein one or more of the plurality of wireless devices receives a reference signal and performs a positioning measurement based on the received reference signal and receives positioning information based on the received reference signal, wherein the received positioning information comprises a positioning measurement reported by a neighboring wireless device performed on the reference signal, wherein the reported positioning measurement is reported by the neighboring wireless device to a network node and the receiving of the positioning information comprises overhearing the positioning measurement report; the one or more wireless device determines further positioning information based on the positioning measurement and the received positioning information and transmits the determined further positioning information to one or more of the plurality of wireless devices and/or to the one or more network nodes; and the one or more network nodes and/or wireless devices determining enhanced positioning accuracy of predetermined positioning estimates based on the received further positioning information.

18. The system of claim 17, wherein the enhanced positioning accuracy comprises ellipse predictions of positioning estimates with reduced variance.

19. A computer program product, carrier or medium comprising instructions which when executed on a computer processor, cause the processor to perform the method of claim 1.

\* \* \* \* \*